(12) United States Patent
Haas

(10) Patent No.: US 12,484,736 B2
(45) Date of Patent: *Dec. 2, 2025

(54) INSULATED FOOD AND BEVERAGE CONTAINER

(71) Applicant: Vinglacé LLC, Houston, TX (US)

(72) Inventor: Colton Bryan Haas, Houston, TX (US)

(73) Assignee: Vinglacé LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/353,712

(22) Filed: Jul. 17, 2023

(65) Prior Publication Data

US 2024/0016338 A1    Jan. 18, 2024

Related U.S. Application Data

(63) Continuation of application No. 18/069,753, filed on Dec. 21, 2022, which is a continuation-in-part of application No. 17/854,654, filed on Jun. 30, 2022, now Pat. No. 11,653,791, which is a continuation of application No. 17/394,015, filed on Aug. 4, 2021, now abandoned, which is a continuation of
(Continued)

(51) Int. Cl.
    *A47J 41/00*      (2006.01)
    *A47J 41/02*      (2006.01)
    *B65D 81/38*      (2006.01)

(52) U.S. Cl.
    CPC ....... *A47J 41/0077* (2013.01); *A47J 41/0088* (2013.01); *A47J 41/024* (2013.01); *A47J 41/026* (2013.01); *A47J 41/028* (2013.01); *B65D 81/3869* (2013.01)

(58) Field of Classification Search
    CPC ...... A47J 41/0077; A47J 41/061; A47J 41/02; A47J 41/0088; A47J 41/024; A47J 41/026; A47J 41/028; A47J 41/00; A47J 41/0055; F16J 15/00
    See application file for complete search history.

(56) References Cited

U.S. PATENT DOCUMENTS

| | | |
|---|---|---|
| D58,871 S | 9/1921 | Bianchini |
| 2,207,543 A | 7/1940 | Knapp |

(Continued)

FOREIGN PATENT DOCUMENTS

| | | |
|---|---|---|
| CA | 41989 A | 4/1977 |
| CN | 2879853 | 3/2007 |

(Continued)

OTHER PUBLICATIONS https://www.amazon.com/Vinglac%C3%A9-Tumbler-Stainless-Insulated-Beverages/dp/B07V1W2S6Y/ref=sr_1_9?dchild=1&keywords=vinglace+tumbler&qid=1590086136&sr=8-9 Vinglac Tumbler (Year: 2019); 4 pages.

(Continued)

*Primary Examiner* — Javier A Pagan
(74) *Attorney, Agent, or Firm* — Womble Bond Dickinson (US) LLP

(57) ABSTRACT

A drinking vessel includes an outer vessel, a deformable retaining flange, and a removable insert structure formed of glass and configured to be disposed within the outer vessel. The insert structure may have a sipping portion configured to extend out of the open end of the outer vessel and the deformable retaining flange is configured to releasably retain the insert structure within the outer vessel.

20 Claims, 21 Drawing Sheets

Related U.S. Application Data application No. 16/100,153, filed on Aug. 9, 2018, now Pat. No. 11,089,906.

(60) Provisional application No. 63/388,290, filed on Jul. 12, 2022, provisional application No. 62/653,185, filed on Apr. 5, 2018.

(56) References Cited

U.S. PATENT DOCUMENTS

| | | |
|---|---|---|
| RE23,106 E | 5/1949 | Gulick |
| 2,661,889 A | 12/1953 | Phinney |
| D177,559 S | 5/1956 | Emmert |
| 2,863,585 A | 12/1958 | Meshberg |
| 2,961,849 A | 11/1960 | Hitchcock |
| D195,905 S | 8/1963 | Wanderer |
| 3,156,279 A | 11/1964 | Grebowiec et al. |
| 3,355,045 A | 11/1967 | David |
| D213,174 S | 1/1969 | Davis |
| 3,424,355 A | 1/1969 | Blumen |
| 3,463,140 A | 8/1969 | Rollor, Jr. |
| 3,603,106 A | 9/1971 | Ryan |
| 3,682,352 A | 8/1972 | Doucette |
| 3,753,512 A | 8/1973 | Curry |
| 3,760,972 A | 9/1973 | McKirnan |
| 3,781,164 A | 12/1973 | McCaffery |
| 3,827,925 A | 8/1974 | Douglas |
| 4,061,782 A | 12/1977 | Baxter |
| D248,453 S | 7/1978 | Summers |
| 4,116,352 A | 9/1978 | Davis |
| 4,138,027 A | 2/1979 | Frye et al. |
| 4,163,374 A | 8/1979 | Moore et al. |
| 4,273,245 A | 6/1981 | Machalek |
| D261,212 S | 10/1981 | Mills |
| 4,448,825 A | 5/1984 | Asahara |
| D282,616 S | 2/1986 | Gallagher et al. |
| D282,897 S | 3/1986 | Conti et al. |
| D286,027 S | 10/1986 | Waher et al. |
| D286,725 S | 11/1986 | Zieff |
| 4,702,385 A | 10/1987 | Shillington et al. |
| D300,495 S | 4/1989 | Minuti |
| D320,559 S | 10/1991 | Olson |
| D321,325 S | 11/1991 | Petrus |
| D327,093 S | 6/1992 | Evenson |
| D328,014 S | 7/1992 | DeCoster et al. |
| D332,049 S | 12/1992 | Burgdorf |
| 5,197,602 A | 3/1993 | Biesecker et al. |
| 5,249,703 A | 10/1993 | Karp |
| D351,790 S | 10/1994 | Haindl |
| D352,210 S | 11/1994 | Cousins et al. |
| D353,297 S | 12/1994 | Sokolski et al. |
| 5,467,891 A | 11/1995 | Perry |
| 5,531,353 A | 7/1996 | Ward |
| D395,579 S | 6/1998 | Jeppesen et al. |
| D402,766 S | 12/1998 | Smith |
| D404,974 S | 2/1999 | Kristinik |
| D416,443 S | 11/1999 | Kilpatrick et al. |
| 5,975,339 A | 11/1999 | Richman |
| D419,822 S | 2/2000 | Woodyard |
| 6,050,443 A | 4/2000 | Tung |
| D426,160 S | 6/2000 | Lindsay et al. |
| 6,085,927 A | 7/2000 | Kusz |
| 6,109,518 A | 8/2000 | Mueller et al. |
| D438,430 S | 3/2001 | Gabrhel |
| D441,288 S | 5/2001 | Pillers |
| D446,687 S | 8/2001 | Furman |
| 6,352,168 B1 | 3/2002 | Lin |
| D455,612 S | 4/2002 | Gullickson et al. |
| D457,779 S | 5/2002 | Gullickson et al. |
| D458,806 S | 6/2002 | Price et al. |
| 6,405,892 B1 | 6/2002 | Volan |
| 6,419,108 B1 | 7/2002 | Toida et al. |
| D465,132 S | 11/2002 | Janky |
| 6,516,548 B2 | 2/2003 | Lage et al. |
| D471,064 S | 3/2003 | Renz |
| D474,110 S | 5/2003 | Sweeney |
| D474,111 S | 5/2003 | Lazaris |
| D476,857 S | 7/2003 | Holsinger |
| D479,995 S | 9/2003 | Duceppe |
| 6,626,326 B2 | 9/2003 | Murakami |
| 6,641,854 B2 | 11/2003 | Gerhart et al. |
| 6,645,537 B2 | 11/2003 | Sweeney et al. |
| 6,789,275 B2 | 9/2004 | Spells et al. |
| D505,830 S | 6/2005 | Smith et al. |
| 6,915,917 B2 | 7/2005 | Watanabe et al. |
| D510,235 S | 10/2005 | Sorensen |
| D516,429 S | 3/2006 | Helps et al. |
| D519,320 S | 4/2006 | Festa |
| D519,785 S | 5/2006 | Bodum |
| 7,104,413 B2 | 9/2006 | Liu |
| 7,118,005 B2 | 10/2006 | Shimazaki |
| 7,124,603 B2 | 10/2006 | Bianco |
| D538,597 S | 3/2007 | Kim |
| D550,034 S | 9/2007 | Bodum |
| D551,502 S | 9/2007 | Bodum |
| D557,561 S | 12/2007 | Flowers et al. |
| D566,471 S | 4/2008 | Bodum |
| D577,253 S | 9/2008 | Bodum |
| D577,547 S | 9/2008 | Willat et al. |
| D582,580 S | 12/2008 | Spangler et al. |
| D588,871 S | 3/2009 | Miller et al. |
| D590,662 S | 4/2009 | Cheng |
| 7,546,932 B2 | 6/2009 | Smith et al. |
| D596,458 S | 7/2009 | McKinney |
| D597,365 S | 8/2009 | Oas |
| D597,791 S | 8/2009 | Lion et al. |
| D599,169 S | 9/2009 | Stalions et al. |
| D603,218 S | 11/2009 | Hollinger |
| D604,157 S | 11/2009 | Reiterer et al. |
| D606,363 S | 12/2009 | Aardenburg |
| 7,669,725 B2 | 3/2010 | Randolph et al. |
| D616,248 S | 5/2010 | George |
| D617,608 S | 6/2010 | Yang |
| D618,964 S | 7/2010 | Eisenhardt |
| D620,316 S | 7/2010 | McKinney |
| D637,913 S | 5/2011 | Schlies et al. |
| 7,934,537 B2 | 5/2011 | Kolowich |
| RE42,421 E | 6/2011 | Toida et al. |
| D644,938 S | 9/2011 | Saunders et al. |
| 8,033,412 B2 | 10/2011 | Mayo |
| D650,633 S | 12/2011 | Birgers |
| 8,152,018 B2 | 4/2012 | Smith et al. |
| D660,081 S | 5/2012 | Gilbert |
| 8,225,957 B1 | 7/2012 | Volan |
| D672,618 S | 12/2012 | Stamper et al. |
| D673,010 S | 12/2012 | Stamper et al. |
| 8,328,014 B2 | 12/2012 | Saunders et al. |
| D675,482 S | 2/2013 | Heggestad et al. |
| D678,769 S | 3/2013 | Kawamura |
| D690,161 S | 9/2013 | Garner |
| 8,534,345 B1 | 9/2013 | French et al. |
| D690,556 S | 10/2013 | Boroski |
| D692,760 S | 11/2013 | Rapparini |
| D693,176 S | 11/2013 | Kaiser |
| D699,996 S | 2/2014 | De Leo |
| 8,684,223 B1 | 4/2014 | Kalamaras |
| 8,695,830 B2 | 4/2014 | Meyers et al. |
| 8,777,044 B1 | 7/2014 | Raymus et al. |
| D710,686 S | 8/2014 | Gowens |
| 8,844,746 B2 | 9/2014 | Meyers et al. |
| D715,145 S | 10/2014 | Yamagishi et al. |
| D717,601 S | 11/2014 | Dixon |
| 8,932,428 B2 | 1/2015 | D'Amato |
| D723,334 S | 3/2015 | Agarwal et al. |
| D725,425 S | 3/2015 | Wittke et al. |
| D727,097 S | 4/2015 | Sorensen et al. |
| 8,998,020 B2 | 4/2015 | Sato et al. |
| D731,240 S | 6/2015 | Bell |
| D732,339 S | 6/2015 | Sorensen et al. |
| D732,889 S | 6/2015 | Eyal |
| D733,497 S | 7/2015 | Sorensen et al. |
| 9,149,139 B1 | 10/2015 | Rogers et al. |
| 9,161,661 B2 | 10/2015 | Kelly |
| D742,173 S | 11/2015 | Perman |

(56) References Cited

U.S. PATENT DOCUMENTS

| | | |
|---|---|---|
| 9,181,015 B2 | 11/2015 | Booska |
| D744,279 S | 12/2015 | Arciero et al. |
| 9,266,667 B2 | 2/2016 | Guoqing et al. |
| D750,436 S | 3/2016 | Hopkins et al. |
| D751,344 S | 3/2016 | Charlton |
| D752,397 S | 3/2016 | Seiders et al. |
| D753,482 S | 4/2016 | Serrano et al. |
| D753,954 S | 4/2016 | Schreiber |
| D754,544 S | 4/2016 | Darling et al. |
| 9,307,853 B2 | 4/2016 | Melton |
| D756,716 S | 5/2016 | Hewitt et al. |
| D756,789 S | 5/2016 | Darling et al. |
| D757,497 S | 5/2016 | Bodium |
| D758,133 S | 6/2016 | Peng |
| 9,414,700 B2 | 8/2016 | Melton |
| 9,422,704 B2 * | 8/2016 | Whitehead ............ F16L 23/024 |
| D766,090 S | 9/2016 | Boroski et al. |
| D766,661 S | 9/2016 | Bodum |
| D767,337 S | 9/2016 | Boroski et al. |
| 9,452,876 B2 | 9/2016 | Anelevitz et al. |
| D769,069 S | 10/2016 | Sanbar |
| D773,250 S | 12/2016 | Miller |
| D774,392 S | 12/2016 | Broad |
| D774,824 S | 12/2016 | Gallagher |
| D774,827 S | 12/2016 | Miller et al. |
| D774,828 S | 12/2016 | Miller |
| D777,575 S | 1/2017 | Harada et al. |
| 9,555,949 B1 | 1/2017 | French et al. |
| D779,285 S | 2/2017 | Seiders et al. |
| D779,875 S | 2/2017 | Gross et al. |
| D779,891 S | 2/2017 | Seiders et al. |
| D779,892 S | 2/2017 | Seiders et al. |
| 9,580,229 B2 | 2/2017 | Thomas |
| D780,530 S | 3/2017 | Seiders et al. |
| D780,531 S | 3/2017 | Seiders et al. |
| D780,532 S | 3/2017 | Seiders et al. |
| D780,533 S | 3/2017 | Seiders et al. |
| D781,655 S | 3/2017 | Koch et al. |
| 9,585,501 B1 | 3/2017 | Hamelink et al. |
| 9,630,771 B2 | 4/2017 | D'Amato |
| 9,634,471 B2 | 4/2017 | Nakai et al. |
| D786,025 S | 5/2017 | Seiders et al. |
| 9,651,299 B1 | 5/2017 | Duff et al. |
| 9,657,155 B2 | 5/2017 | O'Brien et al. |
| D789,155 S | 6/2017 | Triato |
| 9,681,771 B2 | 6/2017 | Herling et al. |
| D795,014 S | 8/2017 | Khayman |
| D795,643 S | 8/2017 | Barlow |
| D795,646 S | 8/2017 | Sorensen et al. |
| 9,750,359 B2 | 9/2017 | Kah |
| 9,750,360 B2 | 9/2017 | Price |
| 9,771,205 B2 | 9/2017 | Melton et al. |
| D799,274 S | 10/2017 | Hewitt et al. |
| D800,501 S | 10/2017 | Rummel et al. |
| 9,820,616 B2 | 11/2017 | Goldfarb et al. |
| D806,478 S | 1/2018 | Struggl |
| D807,168 S | 1/2018 | Bouveret |
| 9,930,982 B2 | 4/2018 | Matsui |
| D820,099 S | 6/2018 | Shoji |
| 10,028,891 B2 | 7/2018 | Luo |
| D824,768 S | 8/2018 | Shirley et al. |
| D825,994 S | 8/2018 | McConnell et al. |
| D826,003 S | 8/2018 | Sieders et al. |
| D828,088 S | 9/2018 | Furneaux et al. |
| D829,058 S | 9/2018 | Sieders et al. |
| D830,126 S | 10/2018 | Rohe |
| D832,052 S | 10/2018 | Sonnichsen et al. |
| D833,818 S | 11/2018 | Sletten |
| D834,892 S | 12/2018 | Melanson et al. |
| 10,160,578 B2 | 12/2018 | Harvey |
| D836,973 S | 1/2019 | Masifilo |
| D839,049 S | 1/2019 | Seiders et al. |
| D839,676 S | 2/2019 | Seiders et al. |
| D839,677 S | 2/2019 | Seiders et al. |
| D839,678 S | 2/2019 | Bruner et al. |
| D842,038 S | 3/2019 | Seiders et al. |
| D847,579 S | 5/2019 | Khan |
| 10,285,522 B2 | 5/2019 | Chin et al. |
| D850,207 S | 6/2019 | Peng |
| D850,857 S | 6/2019 | Bruner et al. |
| D856,754 S | 8/2019 | Haas |
| D858,201 S | 9/2019 | Danner |
| D858,202 S | 9/2019 | Hewitt et al. |
| D858,212 S | 9/2019 | Hewitt et al. |
| D860,720 S | 9/2019 | Gallagher |
| D860,721 S | 9/2019 | Gallagher |
| D860,724 S | 9/2019 | Kassin et al. |
| D863,888 S | 10/2019 | Meyers et al. |
| D865,447 S | 11/2019 | Meyers et al. |
| D866,255 S | 11/2019 | Meyers et al. |
| 10,478,000 B2 | 11/2019 | Choi et al. |
| D871,133 S | 12/2019 | Bullock et al. |
| D871,852 S | 1/2020 | Haas |
| D873,614 S | 1/2020 | Hotell |
| D873,618 S | 1/2020 | Hewitt et al. |
| D874,224 S | 2/2020 | Omdahl et al. |
| D875,471 S | 2/2020 | Cheng et al. |
| D875,474 S | 2/2020 | Deutsch |
| 10,549,902 B1 | 2/2020 | Brown, II et al. |
| D877,567 S | 3/2020 | Zhang |
| D885,136 S | 5/2020 | Haas |
| D885,137 S | 5/2020 | Haas |
| D888,505 S | 6/2020 | Seiders et al. |
| D889,907 S | 7/2020 | Braukmann et al. |
| D890,574 S | 7/2020 | Plott et al. |
| 10,716,427 B2 | 7/2020 | Putnam |
| 10,736,445 B1 | 8/2020 | Brown et al. |
| D898,522 S | 10/2020 | Haas |
| D899,187 S | 10/2020 | Wang et al. |
| D899,854 S | 10/2020 | Jacob |
| D923,428 S | 6/2021 | Haas |
| D928,566 S | 8/2021 | Manz et al. |
| 11,089,906 B2 * | 8/2021 | Haas .................. A47J 41/0088 |
| D930,435 S | 9/2021 | Bruner et al. |
| D935,317 S | 11/2021 | Oh |
| D939,890 S | 1/2022 | Sasena et al. |
| D943,352 S | 2/2022 | Liu |
| D948,284 S | 4/2022 | Bruner |
| D948,937 S | 4/2022 | Bertash et al. |
| D953,108 S | 5/2022 | Krüger |
| D954,501 S | 6/2022 | McCabe |
| D969,555 S | 11/2022 | Aldous et al. |
| D974,117 S | 1/2023 | Lin |
| D993,772 S | 8/2023 | Haas |
| D1,008,730 S | 12/2023 | Haas |
| D1,011,842 S | 1/2024 | Rane |
| 2002/0112502 A1 | 8/2002 | Fiore, Jr. |
| 2002/0162845 A1 | 11/2002 | Yeh |
| 2004/0045974 A1 | 3/2004 | Gruber et al. |
| 2005/0029265 A1 | 2/2005 | Morgan et al. |
| 2005/0098565 A1 | 5/2005 | Liu |
| 2008/0128481 A1 | 6/2008 | Robertson |
| 2010/0038273 A1 | 2/2010 | Johnson |
| 2010/0287723 A1 | 11/2010 | Prokop |
| 2012/0080330 A1 | 4/2012 | Rush et al. |
| 2012/0111877 A1 | 5/2012 | Marshall |
| 2012/0276264 A1 | 11/2012 | Rivera |
| 2013/0248537 A1 | 9/2013 | Lane |
| 2014/0284342 A1 | 9/2014 | Hewitt et al. |
| 2015/0313391 A1 | 11/2015 | Melton et al. |
| 2016/0236816 A1 | 8/2016 | Liu |
| 2017/0320640 A1 | 11/2017 | Steinmann |
| 2017/0349357 A1 | 12/2017 | Yu |
| 2018/0194520 A1 | 7/2018 | Lovern |
| 2018/0242765 A1 | 8/2018 | Rane et al. |
| 2019/0039804 A1 | 2/2019 | Freedman et al. |
| 2019/0092526 A1 * | 3/2019 | Wong ................ B65D 41/0442 |
| 2019/0307292 A1 | 10/2019 | Haas |
| 2020/0022517 A1 | 1/2020 | Stevens |
| 2020/0253401 A1 | 8/2020 | Haas |
| 2020/0385196 A1 | 12/2020 | Haas |

(56) References Cited

U.S. PATENT DOCUMENTS

| | | | |
|---|---|---|---|
| 2021/0163211 | A1 | 6/2021 | Hioki |
| 2021/0401227 | A1 | 12/2021 | Haas |

FOREIGN PATENT DOCUMENTS

| | | | |
|---|---|---|---|
| CN | 300746875 | S | 2/2008 |
| CN | 103705070 | B | 11/2015 |
| CN | 204957371 | U | 1/2016 |
| CN | 304173759 | | 6/2017 |
| CN | 209074054 | U | 7/2019 |
| CN | 305606949 | | 2/2020 |
| DE | 2531675 | A1 | 3/1976 |
| DE | 3807559 | A1 | 9/1989 |
| EP | 1867585 | B1 | 5/2011 |
| EP | 2229085 | B1 | 7/2011 |
| EP | 2641840 | B1 | 10/2015 |
| EP | 3549495 | A1 | 10/2019 |
| GB | 2546902 | A | 8/2017 |
| GB | 2566955 | A | 4/2019 |
| IN | 388677-001 | | 8/2023 |
| JP | D1356326 | S | 4/2009 |
| JP | 4980771 | B2 | 7/2012 |
| JP | D1454674 | S | 11/2012 |
| JP | D1494966 | S | 4/2014 |
| JP | 5487011 | B2 | 5/2014 |
| JP | D1504598 | S | 8/2014 |
| JP | 6135747 | B2 | 5/2017 |
| KR | 20120002101 | U | 3/2012 |
| RU | 202021502808 | | 3/2022 |
| WO | 2008078860 | A1 | 7/2008 |

OTHER PUBLICATIONS https://www.amazon.com/Br%C3%BCMate-Insulated-Champagne-Flute-Flip-Top/dp/B07TFMH15X/ref=sr_1_5?dchild=1&keywords=brumate+12oz+insulated&qid=1590086271&sr=8-5 (Year: 2019); 8 pages.
https://www.amazon.com/TOSSWARE-9oz-Flute-recyclable-shatterproof/dp/B00X5T5512/ref=psdc_13217791_t1_B07TCJSWRB (Year: 2015); 11 pages.
https://www.amazon.com/Sikye-Stainless-Water-Cup-Insulated/dp/B07GYBJ6RD/ref=sr_1_1?dchild=1&keywords=Sikye+12X6cm&qid=1590086390&sr=8-1 (Year: 2018).
Corkcicle Travel Tumbler. (online) 10 pgs. Available at least as early as Jun. 1, 2016. [Retrieved Oct. 6, 2023] https://www.amazon.com/dp/B01GG0CUKK/ref=emc_bcc_2_i?th=1.
Drinco [online] URL: https://www.walmart.com/ip/DRINCO-Stainless-Steel-Tumbler-Vacuum-Insulated-Tumbler-Whiskey-Glass-Rocks-Glass-GULT-10oz-Forest/49194901 (site visited: Feb. 29, 2024) (Year: 2024).
Elevated Craft [online] URL: https://www.amazon.com/dp/B0BKLXK5XP (site visited: Feb. 29, 2024) (Year: 2022).
European Patent Office; Intent to Grant issued for European Application No. 19163572.1 dated Dec. 7, 2022; 80 pages.
KEEPEE [online] URL: https://www.amazon.com/KEEPEE-Whiskey-Glasses-Set-Margaritas/dp/B0CB5J6BZ3?th=1 (site visited: Feb. 29, 2024) (Year: 2023).
MoreFeel [online] URL: https://www.amazon.com/Insulated-Wine-Tumbler-Stainless-outside/dp/B0B6BJQ5PQ (site visited: Feb. 29, 2024) (Year: 2022).
Non-Tipping 10oz Wine Tumblers (online) 12 pgs. Available at least as early as Jul. 20, 2021. [Retrieved Mar. 13, 2023] https://toadfish.com/products/non-tipping-10oz-wine-tumblers.
United States Patent and Trademark Office; Notice of Allowance for U.S. Appl. No. 16/863,379; dated Jun. 15, 2023; 7 pages.
United States Patent and Trademark Office; Notice of Allowance for U.S. Appl. No. 17/854,654; dated Apr. 20, 2023; 2 pages.
United States Patent and Trademark Office; Notice of Allowance for U.S. Appl. No. 29/661,461; dated May 13, 2019; 9 pages.
United States Patent and Trademark Office; Notice of Allowance for U.S. Appl. No. 29/661,472; dated May 29, 2019; 7 pages.
United States Patent and Trademark Office, Notice of Allowance for U.S. Appl. No. 29/720,208, dated Mar. 18, 2020, 6 pgs.
United States Patent and Trademark Office, Notice of Allowance for U.S. Appl. No. 29/720,211, dated Mar. 18, 2020, 6 pgs.
United States Patent and Trademark Office; Ex Parte Quayle Action issued for U.S. Appl. No. 29/726,546; dated May 27, 2020; 4 pages.
United States Patent and Trademark Office; Notice of Allowance issued for U.S. Appl. No. 29/726,546; dated Aug. 6, 2020; 5 pages.
United States Patent and Trademark Office; Office Action issued for U.S. Appl. No. 29/869,187; dated Mar. 18, 2024; 8 pages.
United States Patent and Trademark Office; Notice of Allowance issued for U.S. Appl. No. 29/869,187; dated Jul. 10, 2024; 8 pages.
United States Patent and Trademark Office; Notice of Allowance for U.S. Appl. No. 29/878,774; dated Oct. 23, 2023; 23 pages.
Vastigo [online] URL: https://www.amazon.com/Vastigo-Insulated-Stainless-Removable-Cool-Stainless/dp/B0BZT7FSY1?th=1 (site visited: Feb. 29, 2024) (Year: 2023).
Vinglace [online] URL: https://www.amazon.com/Vinglac%C3%A9-Tumbler-Stainless-Insulated-Beverages/dp/B086FRZFZV?th=1 (site visited: Feb. 29, 2024) (Year: 2020).
Vinglace [online] URL: https://vinglace.com/products/whiskey-glass (site visited: Feb. 29, 2024) (Year: 2022).
Canadian Patent Office; Office Action issued for Canadian Application No. 3,038,313 dated Apr. 24, 2024; 5 pages.
U.S. Appl. No. 29/842,691, filed Jun. 15, 2022, Colton Bryan Haas.
Brumate; Rocks Tumbler 12 Oz Onyx Lepard; https://brumate.com/collections/spirits/products/brumate-rocks-tumbler-12oz-onyx-leopard; dated 2021; 10 pages.
Corkcicle; Exotic Stemless; https://corkcicle.com/products/exotic-stemless?variant=39257106579544; Retrieved from Internet Mar. 28, 2021; 5 pages.
Corkcicle; Stemless Flute; https://corkcicle.com/products/classic-stemless-flute?refSrc=4430534279256&nosto=productpage-nosto-2; Retrieved from Internet Mar. 28, 2021; 5 pages.
United States Patent and Trademark Office; Final Office Action for U.S. Appl. No. 17/854,654; dated Jan. 26, 2023; 8 pages.
United States Patent and Trademark Office; Non-Final Office Action for U.S. Appl. No. 17/001,111; dated Jul. 26, 2021; 20 pages.
United States Patent and Trademark Office; Non-Final Office Action for U.S. Appl. No. 17/001,111; dated Mar. 22, 2021; 19 pages.
United States Patent and Trademark Office; Non-Final Office Action for U.S. Appl. No. 17/854,654; dated Oct. 18, 2022; 18 pages.
United States Patent and Trademark Office; Notice of Allowance for U.S. Appl. No. 17/854,654; dated Feb. 23, 2023; 7 pages.
United States Patent and Trademark Office; Requirement for Restriction/Election for U.S. Appl. No. 17/854,654; dated Aug. 11, 2022; 6 pages.
United States Patent and Trademark Office; Requirement for Restriction/Election for U.S. Appl. No. 17/001,111; dated Jan. 27, 2021; 7 pages.
Yeti Coolers, Colster Can Insulators, Apr. 15, 2020, 5 pages. https://www.yeti.com/en_US/can-insulators.
Zoetica; The Cortado Cup; https://zoetica.myshopify.com/collections/beverage-collection/products/wine-cup; dated Aug. 6, 2020; 4 pages.
amazon.com, Capture Classic 12 Insulated Double Wall Tumbler Cup with Lid, Reusable Straw & Hello Name Tags, available on Amazon.com, date first available Mar. 25, 2014, 6 pgs., [site visited Nov. 3, 2022], URL: https://www.amazon.com/Cupture-Classic-Insulated-Tumbler-Reusable/dp/B00J8CPIPI?th=1/ (Year: 2014).
amazon.com, Tervis Made in USA Double Walled Clear & Colorful Tabletop Insulated Tumbler Cups Keep Drinks Cold & Hot, available on Amazon.com, date firstavailable Jul. 1, 2004, 5 pgs., [site visited Nov. 3, 2022], URL:. https://www.amazon.com/dp/B0002MR2WU/?th=1/ (Year: 2004).
amazon.com, W Gallery 175 Black Vials—19 DRAM Pop Top Bottle, first available Oct. 22, 2020. [site visited Nov. 3, 2022], 2 pgs., URL: https://www.amazon.com/Gallery-175-Black-Vials-Prescription/dp/B08LNBP2BJ/ (Year: 2020).
theverge.com, Smart pill bottle measures meds using touchscreen technology. Published Oct. 8, 2012 by Adrianne Jeffries, [site visited

(56) References Cited

OTHER PUBLICATIONS

Nov. 3, 2022], 4 pgs., URL: https://www.theverge.com/2012/10/8/3473218/smart-pill-bottle-adheretech-capacitance/ (Year: 2012).

toadfish.com, Wine Tumbler + Inserts (2-Pack), available on toadfish.com, Publication date unavailable, [site visited Nov. 3, 202], 2 pgs., URL: https://toadfish.com/products/wine-tumbler-glass-insert-2-pack-bundle/ (Year: 0).

United States Patent and Trademark Office; Final Office Action for U.S. Appl. No. 17/001,111; dated Aug. 24, 2022; 13 pages.

United States Patent and Trademark Office; Non-Final Office Action for U.S. Appl. No. 29/842,691; dated Dec. 6, 2022; 6 pages.

United States Patent and Trademark Office; Non-Final Office Action for U.S. Appl. No. 18/069,753; Oct. 21, 2024; 17 pages.

United States Patent and Trademark Office; Non-Final Office Action issued for U.S. Appl. No. 29/917,938; dated Jun. 5, 2025; 60 pages.

United States Patent and Trademark Office; Non-Final Office Action for U.S. Appl. No. 16/863,379; dated Mar. 23, 2023; 35 pages.

United States Patent and Trademark Office; Notice of Allowance for U.S. Appl. No. 29/794,074; dated Feb. 6, 2023; 8 pages.

United States Patent and Trademark Office; Notice of Allowance for U.S. Appl. No. 29/842,691; dated Mar. 22, 2023; 6 pages.

United States Patent and Trademark Office; Requirement for Restriction/Election for U.S. Appl. No. 16/863,379; dated Feb. 6, 2023; 7 pages.

Bijli Bachao, Learning from a Thermos—Designing a well insulated space, dated Apr. 22, 2016, 4 pgs., https://www.bijlibachao.com/insulation/learning-from-a-thermos-designing-a-well-insulated-room.html.

Davide Lora, Phase change material product design. Market and business development assessment in the food industry, Lora-MSC select master thesis, extended summary, Jul. 2014, 10 pgs., https://fenix.tecnico.ulisboa.pt/downloadFile/563345090412751/Article.pdf.

Essay Forum, The components of a thermos flask to maintain hot liquid (IELTS 1), dated Mar. 14, 15, 2 pgs., https://essayforum.com/writing/components-thermos-flask-maintain-hot-liquid-62308/.

European Patent Office, Search Report of EP App. No. EP19163572.1, which is in the same family as U.S. Appl. No. 16/100,153, dated Jul. 29, 2019, 7 pages.

United States Patent and Trademark Office, Non-Final Office Action of U.S. Appl. No. 16/100,153, dated Jan. 27, 2020, 22 pages.

United States Patent and Trademark Office; Advisory Action Before the Filing of an Appeal Brief for U.S. Appl. No. 17/001,111; mailed on Feb. 28, 2022; 5 pages.

United States Patent and Trademark Office; Final Office Action for U.S. Appl. No. 17/001,111; dated Nov. 15, 2021; 22 pages.

United States Patent and Trademark Office; Final Office Action for U.S. Appl. No. 17/394,015; dated Apr. 4, 2022; 28 pages.

United States Patent and Trademark Office; Final Office Action of U.S. Appl. No. 16/100,153; mailed on Dec. 17, 2020; 21 pages.

United States Patent and Trademark Office; Non-Final Office Action for U.S. Appl. No. 17/001,111; dated Apr. 7, 2022; 23 pages.

United States Patent and Trademark Office; Non-Final Office Action for U.S. Appl. No. 17/394,015; dated Dec. 10, 2021; 20 pages.

United States Patent and Trademark Office; Notice of Allowance for U.S. Appl. No. 16/100,153; dated Jul. 1, 2021; 10 pages.

* cited by examiner

INSULATED FOOD AND BEVERAGE CONTAINER

CROSS-REFERENCE TO RELATED APPLICATIONS

This application is a continuation application of U.S. patent application Ser. No. 18/069,753 filed on Dec. 21, 2022, which is a continuation-in-part of and claims priority to U.S. patent application Ser. No. 17/854,654 filed Jun. 30, 2022 (now issued as U.S. Pat. No. 11,653,791), which is a continuation of and claims priority to U.S. patent application Ser. No. 17/394,015 filed Aug. 4, 2021, which is a continuation of and claims priority to U.S. patent application Ser. No. 16/100,153 filed Aug. 9, 2018 (now issued U.S. Pat. No. 11,089,906), which claims the benefit of U.S. Provisional Patent Application No. 62/653,185 filed Apr. 5, 2018. U.S. patent application Ser. No. 18/069,753 filed on Dec. 21, 2022 also claims the benefit of U.S. Provisional Patent Application No. 63/388,290 filed Jul. 12, 2022. The entire contents of each of the applications listed above are incorporated herein by reference.

FIELD OF THE DISCLOSURE

An insulated container for maintaining the temperature of food and/or beverage contained therein is generally described. More specifically, an insulated container having a vacuum-insulated outer container and a removable glass insert that protects a user's lips from contacting the outer container, is described.

BACKGROUND OF THE DISCLOSURE

Maintaining the temperatures of food and beverages is vital to enjoying the complete characteristics they have to offer. Various types of containers are used to maintain the temperatures of the contents (food or beverage) of such containers. For instance, when beverages are placed in such containers, ice is often added to the beverages, such that that they are in contact with the ice and become cooler based on the contact. A disadvantage with such coolers is that once the ice melts, it dilutes the beverage contained therein and the beverage may become warm. Another disadvantage is that once the beverage has been in the container for some time, large amounts of liquid (i.e., condensation) may form on the external surface of the container, which may make the container slippery and cause it to fall out of the user's hands. This may be dangerous to the user and others nearby, particular when the containers are made of glass. In some instances, when the contents of the container are hot (such as soup or other heated food), the container may be too hot and uncomfortable to the user's hands.

Some insulating containers may be made of metals. While such metallic containers may provide insulative properties, a disadvantage with these metallic containers is that they may result in the leaching of metals into the food or beverages contained therein. Some metallic containers may be made of stainless steel, which is often manufactured using a nickel alloy, such as nickel-iron. Iron and nickel have been found to leach into some alkaline and acidic foods and beverages, which may be hazardous to a user's/consumer's health.

In view of the disadvantages associated with presently available food and beverage containers, there is a need for an insulating container that maintains the temperature of food or beverages, and prevents the formation of condensation on an external surface of the container. Additionally, there is a need for an insulating container that maintains the temperature of hot or cold food and/or beverages contained therein, while also reducing a user's exposure to leached metals.

BRIEF DESCRIPTION OF THE EXEMPLARY EMBODIMENTS

According to an aspect, the exemplary embodiments include an insulated container including an outer vessel and an insert structure. In some embodiments, the outer vessel includes a closed end, an open end, and a side wall extending between the closed end and the open end, with the side wall and the closed end together forming a hollow interior. In some embodiments, the insert structure may be removably arranged within the hollow interior. In some embodiments, the insert structure may include a body having an open upper end and a base end, and a sipping portion extending from the upper end, the sipping portion comprising a sipping end and a shoulder end spaced apart from the sipping end. In some embodiments, the sipping portion may be configured to protrude from the open end of the outer vessel. In some embodiments, an inner diameter of the sipping portion from the shoulder end to the sipping end may vary, for example with the sipping end having a greater inner diameter than the shoulder end.

In another aspect, the exemplary embodiments include a removable insert structure having a body and a sipping portion. The body may include a hollow cavity configured to retain fluid therein and to be removably received within a hollow interior of an outer vessel, with the body having a closed end and an open end. The sipping portion may extend from the open end of the body. In some embodiments, the sipping portion may include a shoulder end and a sipping end (e.g. which may be spaced apart from the shoulder end). In some embodiments, an outer diameter of the sipping portion may be constant from the shoulder end to the sipping end. In some embodiments, an inner diameter of the sipping portion may vary between the shoulder end and the sipping end, for example with the sipping end having a greater inner diameter than the shoulder end.

In a further aspect, the exemplary embodiments include a lid, configured for use on an insulated container having an outer vessel and a removable glass insert vessel dispose therein. In some embodiments, the lid may include an end plate configured to be seated atop a sipping portion of the removable glass insert vessel and to span an open end of the insulated container, an outer skirt extending from the end plate and configured to extend downward beyond the sipping portion of the glass insert vessel to contact an outer surface of the outer vessel, an inner skirt extending from the end plate and configured to extend downward beyond the sipping portion of the glass insert vessel into a hollow cavity of the glass insert vessel, and a deformable flange or gasket disposed on an outer surface of the inner skirt and/or an inner surface of the outer skirt and configured to removably attach the lid to the insulated container. In some embodiments, the lid may be configured to sandwich the sipping portion of the glass insert vessel between the end plate of the lid and a rim of the outer vessel and to sandwich the sipping portion between the inner skirt and the outer skirt, for example when the lid is disposed on the insulated container.

BRIEF DESCRIPTION OF THE DRAWINGS

A more particular description will be rendered by reference to specific embodiments thereof that are illustrated in the appended drawings. Understanding that these drawings depict only typical embodiments thereof and are not therefore to be considered to be limiting of its scope, exemplary embodiments will be described and explained with additional specificity and detail through the use of the accompanying drawings in which.

Figures 1A, 1B:
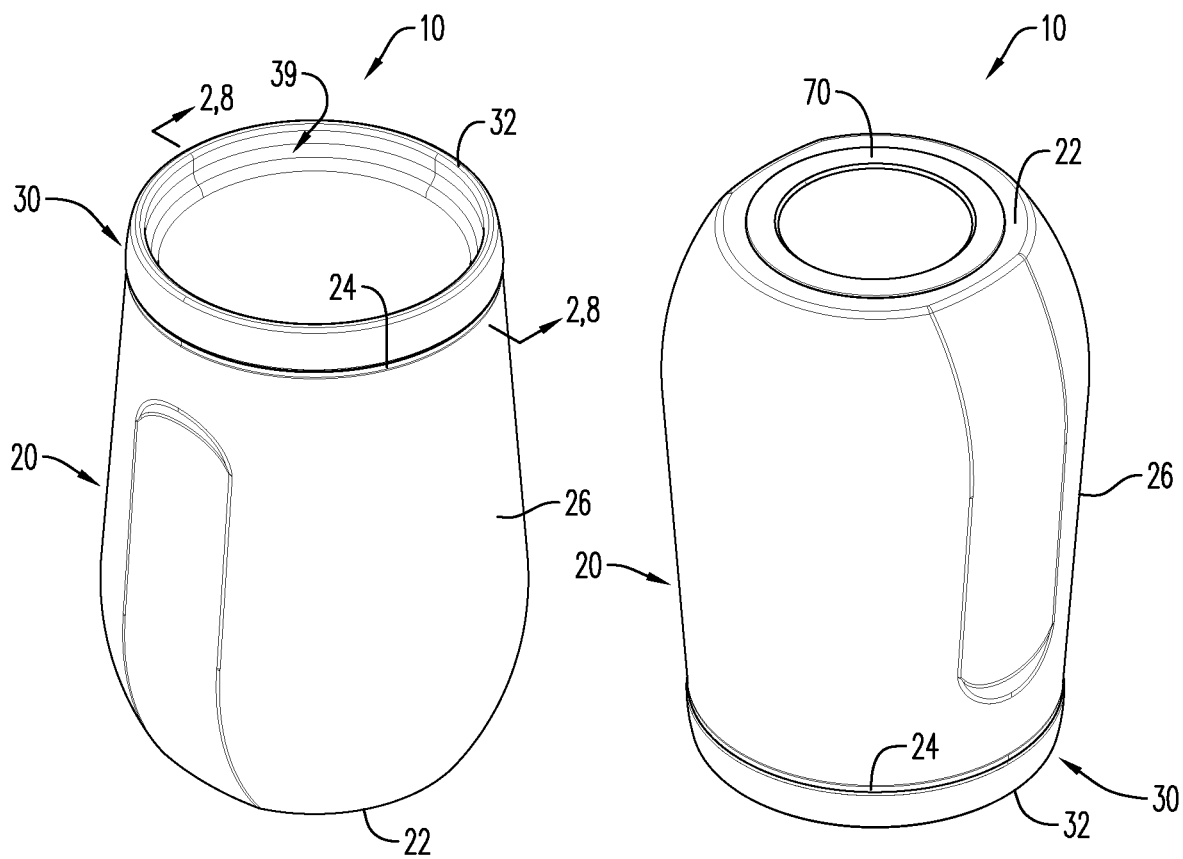
FIG. 1A is a top down, perspective view of an insulated container, according to an embodiment.
FIG. 1B is a bottom, perspective view the insulated container of FIG. 1A, illustrating a coaster according to an embodiment.

Various features, aspects, and advantages of the embodiments will become more apparent from the following detailed description, along with the accompanying figures in which like numerals represent like components throughout the figures and text. The various described features are not necessarily drawn to scale, but are drawn to emphasize specific features relevant to some embodiments.

The headings used herein are for organizational purposes only and are not meant to limit the scope of the description or the claims. To facilitate understanding, reference numerals have been used, where possible, to designate like elements common to the figures.

DETAILED DESCRIPTION

For purposes of illustrating features of the embodiments, examples will now be introduced and referenced throughout the disclosure. Those skilled in the art will recognize that these examples are illustrative and not limiting, and are provided purely for explanatory purposes.

FIGS. 1A-3B, 6A-7 and 9A-9B illustrate an insulated container 10, and it associated components. The insulated container 10 may include an outer vessel, such as a double-walled structure 20, which may be vacuum-insulated. The type of material selected to form the double-walled structure 20 may be based at least in part on the material's capability for repeated and long-term use. According to an aspect, the double-walled structure 20 is composed of a metal, such as stainless steel. The type of metal selected for the double-walled structure may be based, at least in part, on its strength. For example, the double-walled structure 20, when made of stainless steel, may have superior strength-to-weight ratio, which may help to form a more stable insulated container 10, as compared to containers composed of aluminum, glass, ceramic, or various plastic materials.

Figure 1C:
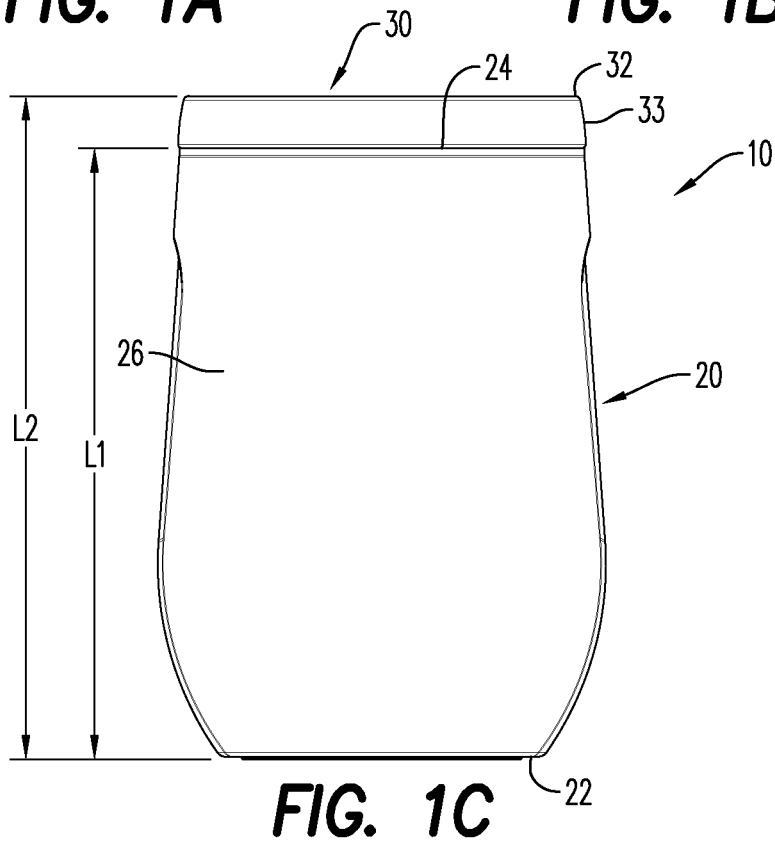
FIG. 1C is a side, perspective view of the insulated container of FIG. 1A.
Figure 1D:
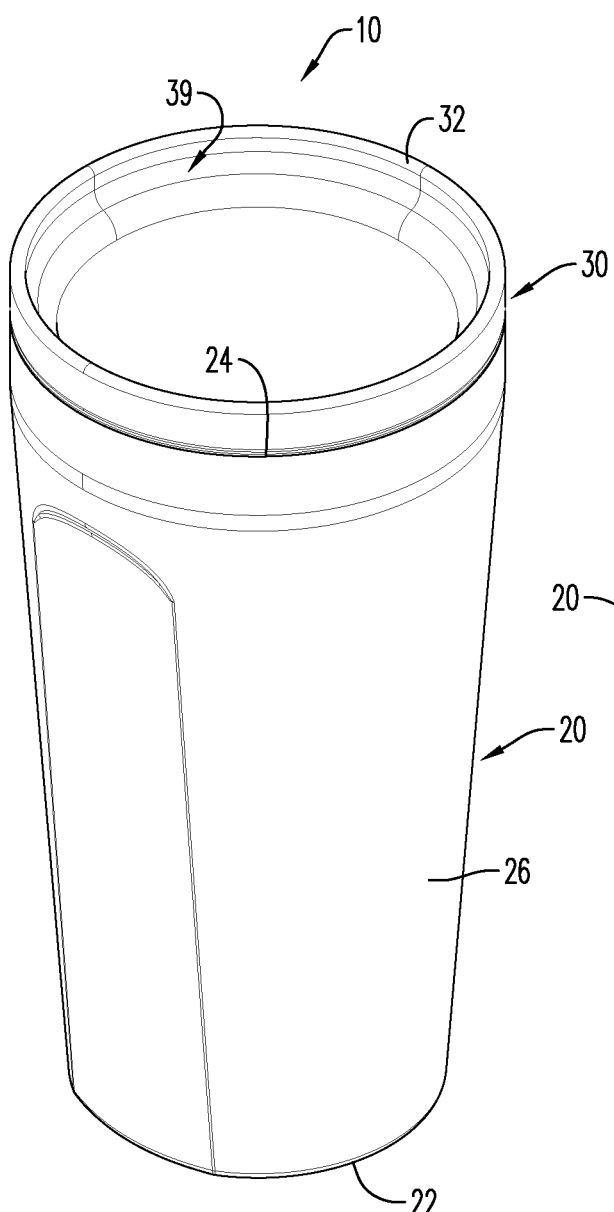
FIG. 1D is a top down, perspective view of an insulated container, according to an embodiment.
Figure 1E:
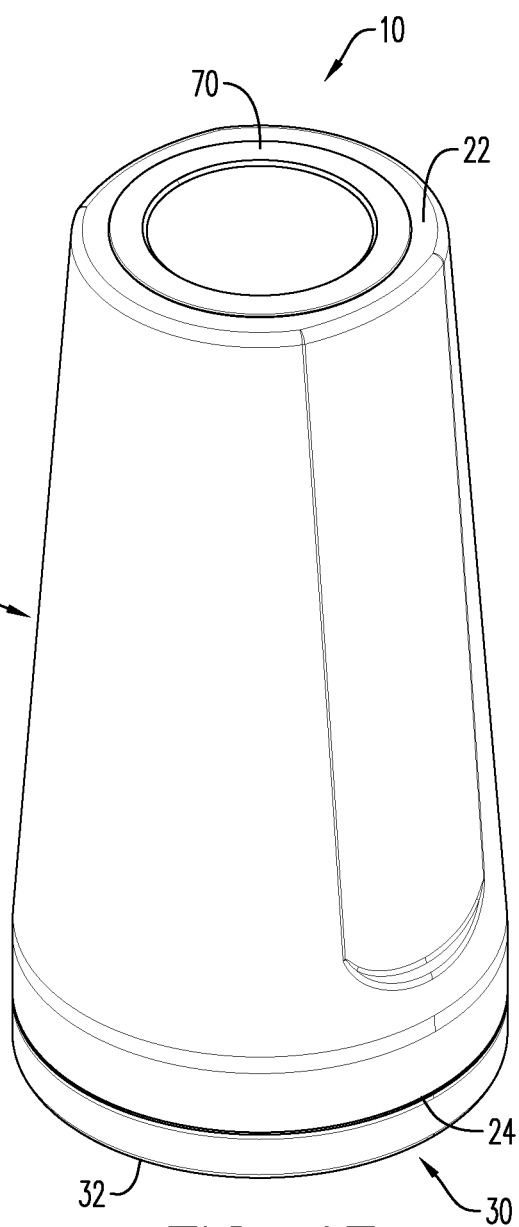
FIG. 1E is a bottom, perspective view the insulated container of FIG. 1D, illustrating a coaster according to an embodiment.

The double-walled structure 20 includes a closed end/base 22 and an open end/rim portion 24. As illustrated in FIGS. 1B and 1E, the closed end 22 is generally planar and may include a raised platform/coaster 70. The coaster 70 may be dimensioned so that it covers less than a total surface area of the closed end 22. The coaster 70 may include and/or be formed from materials that reduce friction between the double-walled structure 20 and smooth/slippery surfaces, such as glass, granite, wood, and the like. According to an aspect, the coaster 70 is formed from a variety of materials, including rubber, plastic, and foam, as would be understood by one of ordinary skill in the art. The coaster 70 may help stabilize the insulated container 10 when the insulated container 10 is positioned on slippery surfaces. The coaster 70 may help prevent potential spill of contents of the insulated container 10 and, in some instances, damage of the surface on which it is placed.

A side wall 26 extends between the closed and open ends 22, 24. In some embodiments, the side wall 26 may include an inner wall and an outer wall. The side wall 26 and the closed end 22 together form a hollow interior/internal space 28, which receives materials or additional structures/containers therein. According to an aspect, the side wall 26 has a generally circular cross-section (see, for example, FIG. 6B) along at least a portion of its length L1 (FIG. 1C). As illustrated in FIGS. 1D-1E, the outer diameter of the double-walled structure 20 may increase from the closed end 22 to the open end 24. According to an aspect and as illustrated in FIGS. 1A-1C, the side wall 26 is contoured so that it has a generally convex outer surface 27 close to the closed end 22. In this configuration, the outer diameter of the double-walled structure 20 may increase from the closed end 22 to an intermediate position 26a along the side wall 26 (FIGS. 1A-1B, and 2), and decrease from the intermediate position 26a to the open end 24, so that the double-walled structure 20 has a contoured side wall 26. In an embodiment, and as illustrated in FIG. 1D and FIG. 1E, the side wall 26 is contoured so that it has a generally convex outer surface 27 close to the open end 24. The contoured side wall 26 may provide increased available space (e.g. a gap that may be subjected to a vacuum) between walls (e.g. between the inner and outer walls) of the double-walled structure.

Figure 2:
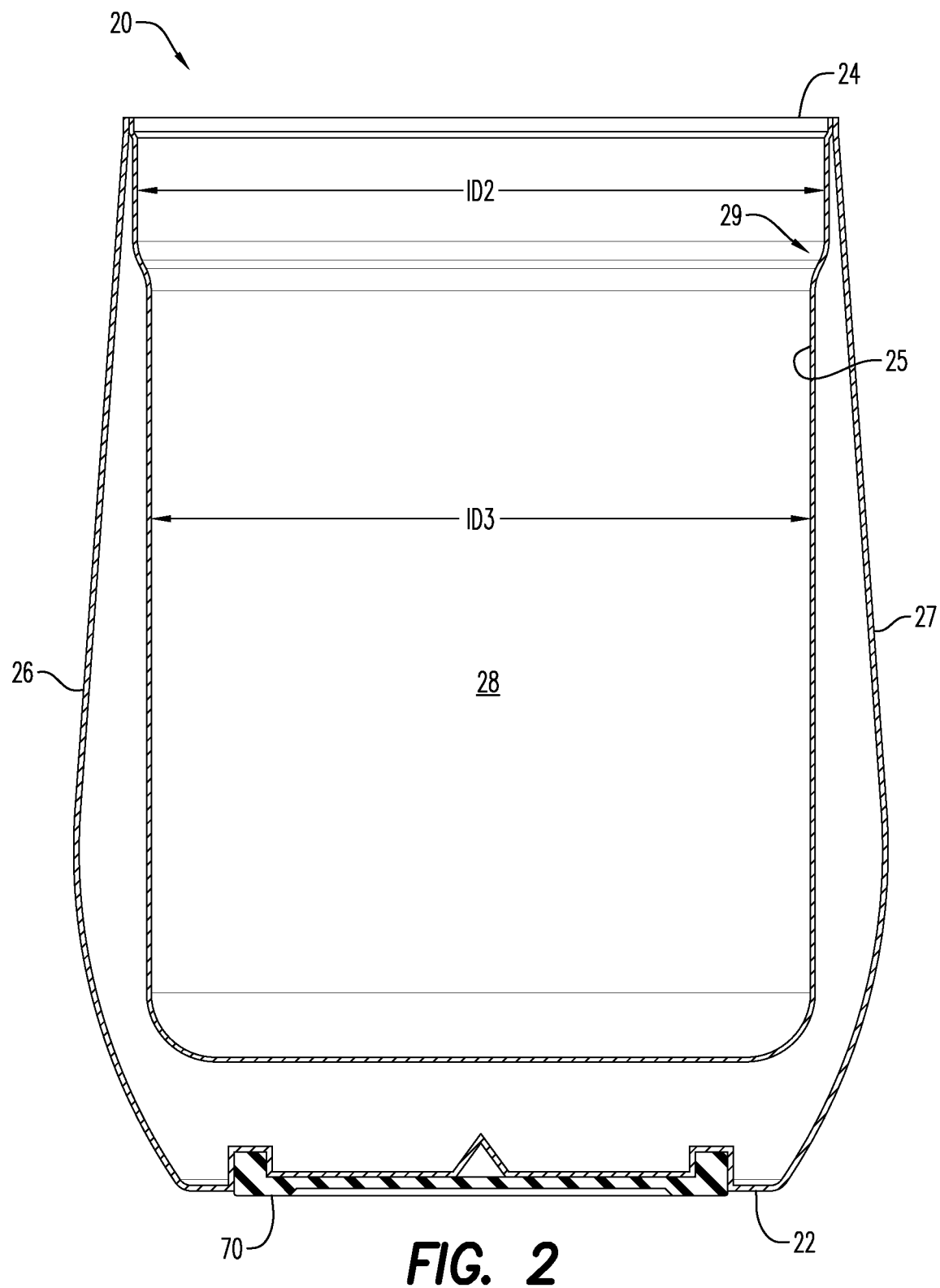
FIG. 2 is a cross-sectional view of a double-walled structure of the insulated container of FIG. 1A.

As illustrated in FIG. 2, FIGS. 6B-6C and FIG. 6E, the double-walled structure 20 may include at least one stepped portion 29 formed in its inner surface 25. The stepped portion 29 is illustrated as partially extending from the open end 24 towards the closed end 22. The inner surface 25 of the double-walled structure 20 may be generally planar, with the stepped portion 29 having an increased inner diameter. As illustrated in FIG. 2, the double-walled structure 20 has a first inner diameter ID2 along the stepped portion 29, and a second inner diameter ID3 extending from the stepped portion 29 to the closed end 22. The first inner diameter ID2 may be greater than the second inner diameter ID3, which may help facilitate securing an additional structure within the hollow interior 28, as described in detail hereinbelow. According to an aspect and as illustrated in FIG. 2, the second inner diameter ID3 may be substantially uniform from the stepped portion 29 towards the closed end 22 of the double-walled structure 20. In an embodiment, the second inner diameter ID3 may gradually decrease from the stepped portion 29 towards the closed end 22 of the double-walled structure 20 to receive a glass structure 30 (as seen in, for instance, FIGS. 6D-6F).

Figure 6A:
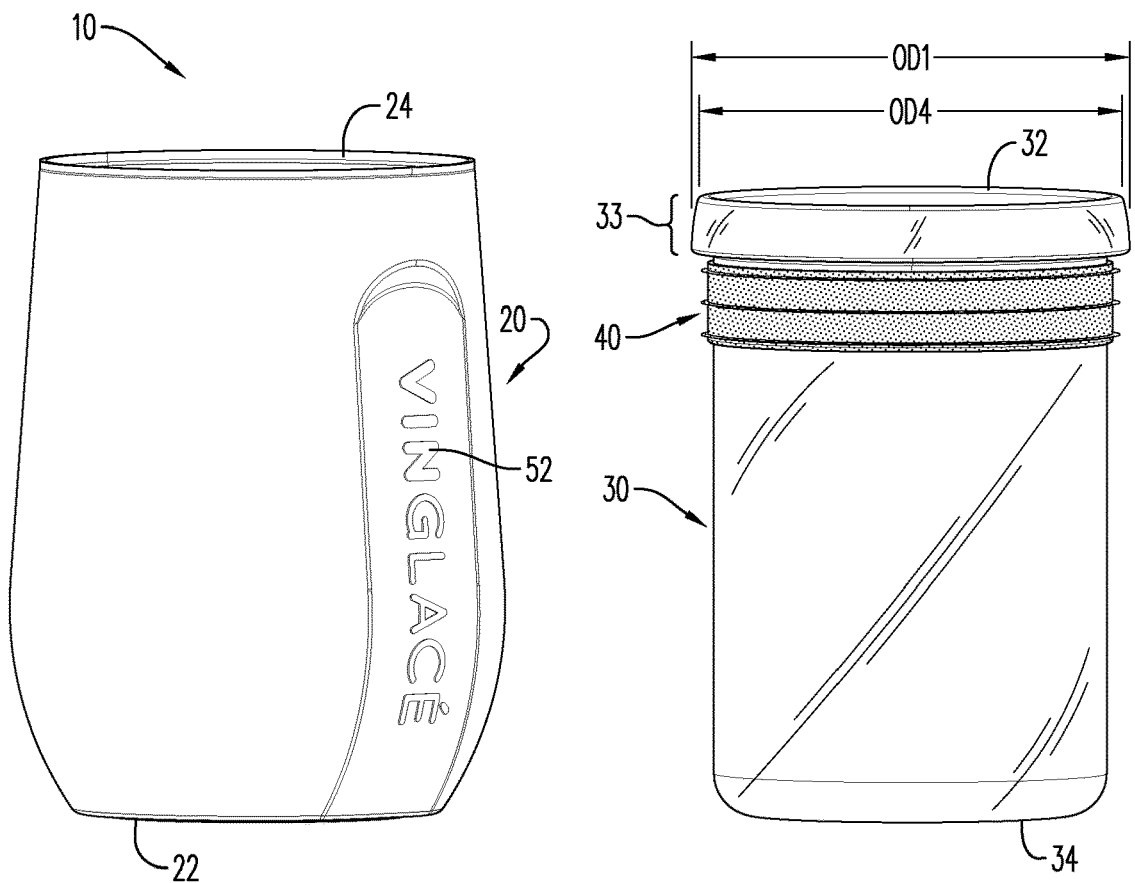
FIG. 6A is a side, perspective view of an insulated container, according to an embodiment.
Figure 6B:
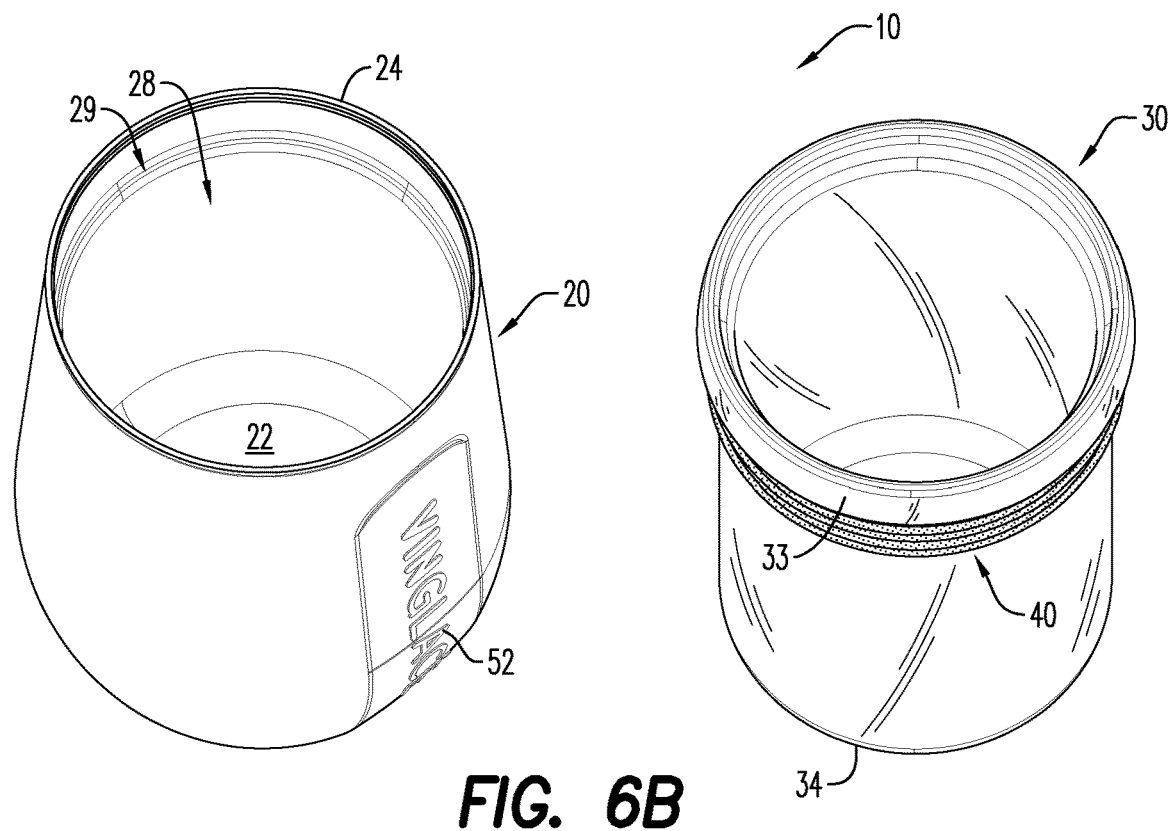
FIG. 6B is a top down, perspective view of the insulated container of FIG. 6A.
Figure 6C:
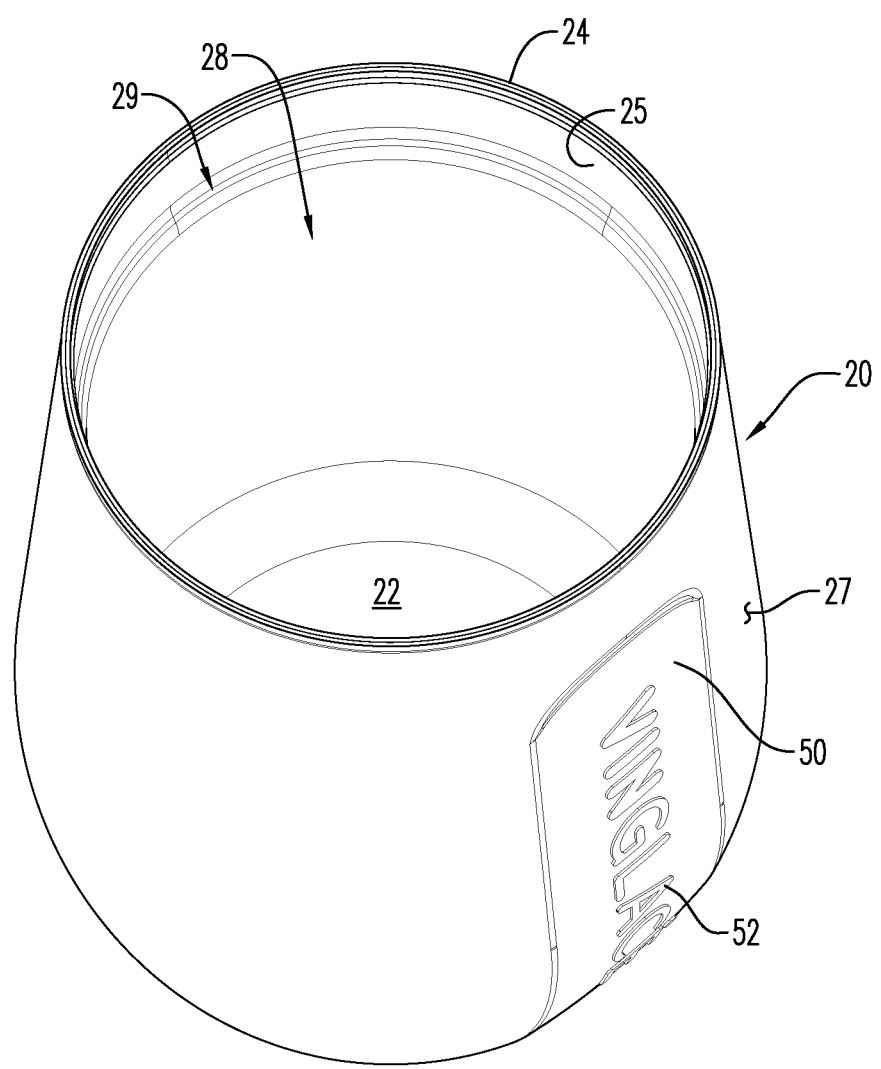
FIG. 6C is a top down, perspective view of the insulated container of FIG. 6A, illustrating an inner surface and stepped portions of a double-walled structure, according to an embodiment.
Figure 6D:
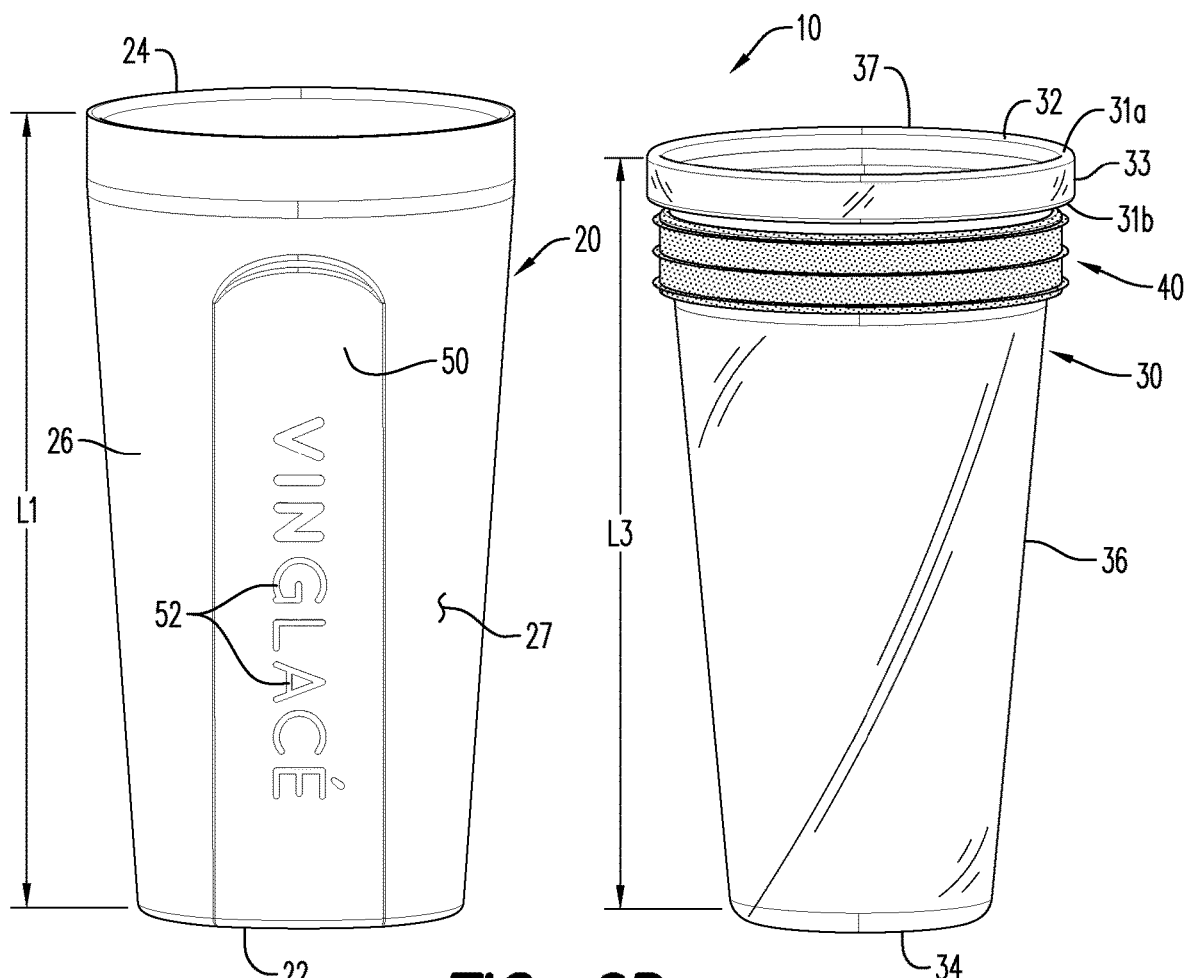
FIG. 6D is a side, perspective view of an insulated container having a frustoconical shape, according to an aspect.
Figure 7:
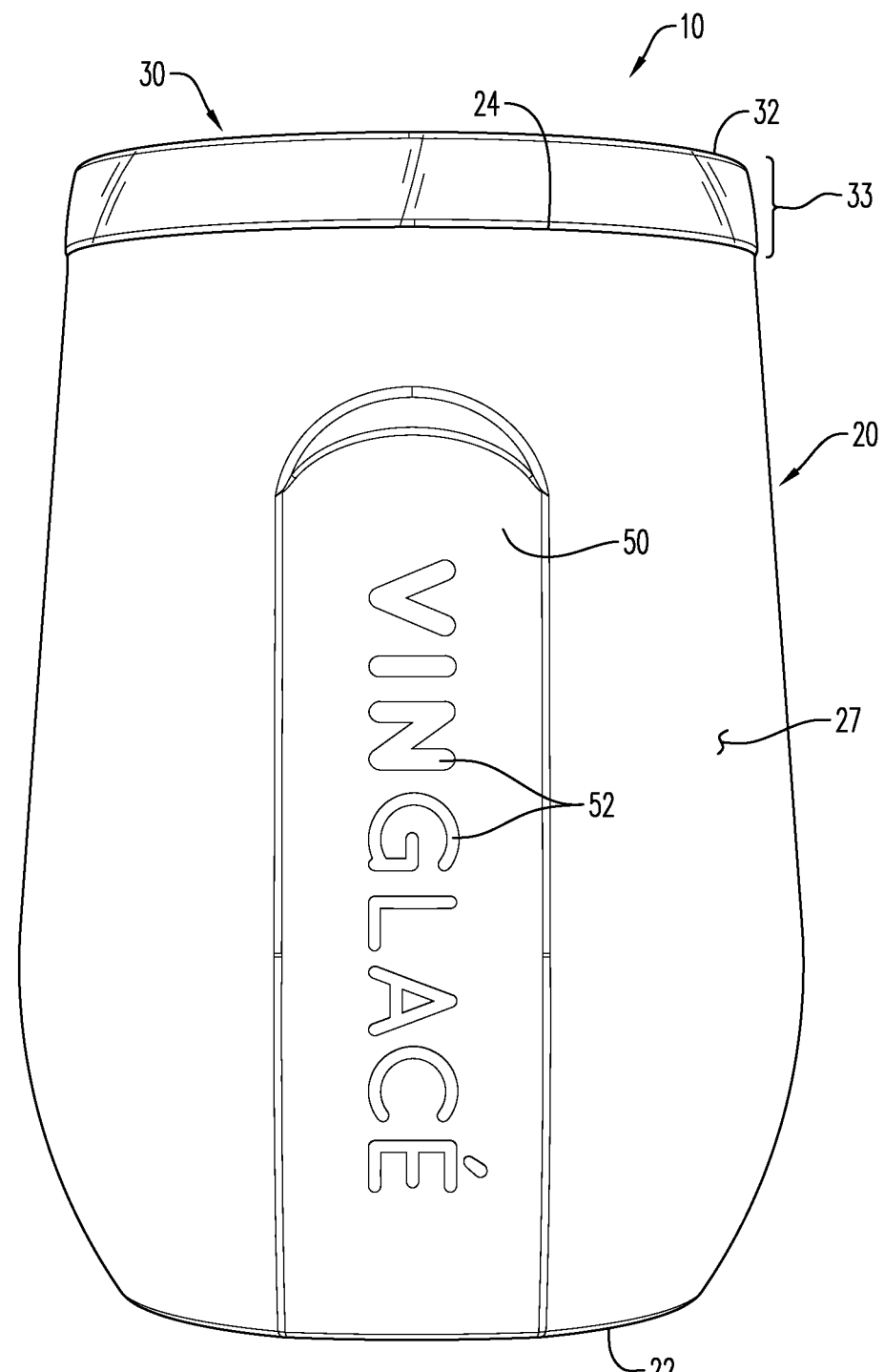
FIG. 7 is a side, perspective view an insulated container, illustrating indentations formed in an external surface of the container, according to an aspect.

According to an aspect and as illustrated in FIG. 7, the double-walled structure 20 may include a plurality of indentations 50 formed in its outer surface 27. The indentations 50 may be recessed areas/depressions formed in the side wall 26. The indentations 50 may be recessed from the overall structure, and according to one aspect the indentions 50 maintain an outwardly rounded/curved surface (i.e., bowed area) or a flattened area. In the illustrated embodiment, the indentations 50 extend from the closed end 22 of the double-walled structure 20 to an intermediate position between the closed end 22 and the open end 24. However, other possibilities are contemplated. In an embodiment, the indentations 50 are configured as rectangular-shaped areas, the longer sides of the rectangular-shaped areas extending from the closed end 22 towards the open end 24. The indentations 50 partially extend from the outer surface 27 inward towards the inner surface 25 of the double-walled structure 20, and may function as grip areas/surfaces for placement of the user's fingers to help provide a more secure/stable grip for a user of the insulated container 10. According to an aspect and as illustrated in FIGS. 6A-6D and FIG. 7, the indentions 50 may include one of more raised tactile portions 52 (such as stamped letters, numbers, or markings) that further help to enhance the user's grip on the insulated container 10. The tactile portion 52 may include raised or indented (not shown) areas. The indentations 50 may also enhance the user's comfort when holding the insulated container 10, accessing the contents of the insulated container 10, or pouring or drinking from the insulated container 10. In some embodiments, the indentations 50 may span more than 50% of a length L1 of the double-walled structure 20. The indentations 50 may span from about 50% to about 85% the total length L1 of the double-walled structure 20. According to an aspect, the indentations 50 may be from about 30 mm to about 40 mm wide.

Figure 9A:
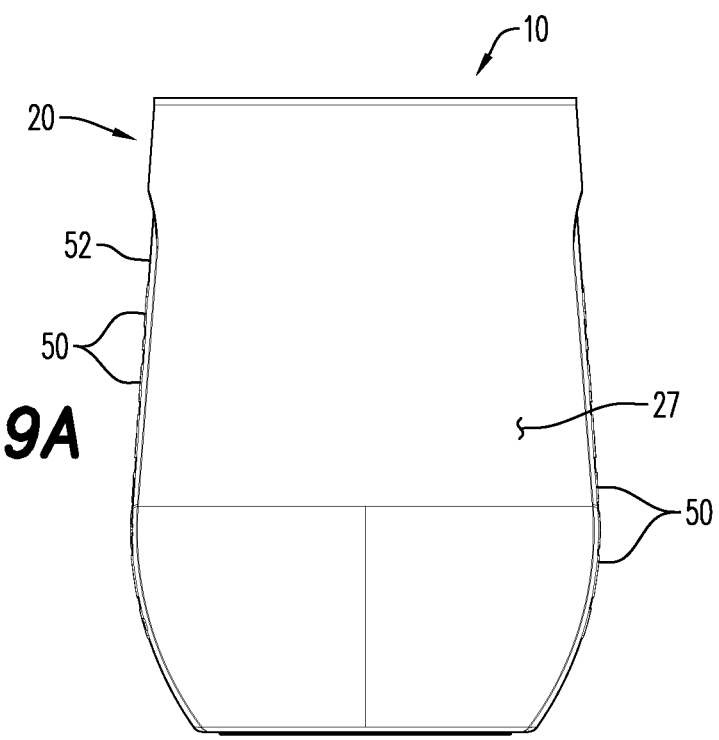
FIG. 9A is a side view of an insulated container, illustrating bilateral indentations formed in an external surface of the container of FIG. 1A.
Figure 9B:
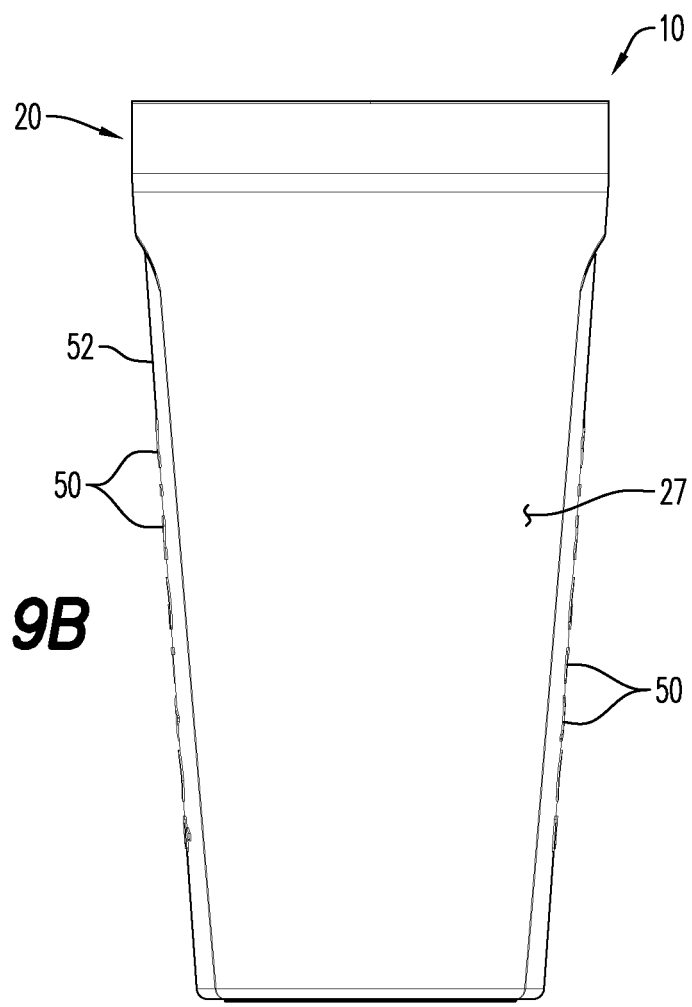
FIG. 9B is side view of an insulated container, illustrating bilateral indentations formed in an external surface of the container of FIG. 1D.

In an embodiment and as illustrated in FIGS. 9A and 9B, the indentations 50 are bilateral indentations 50 (i.e., a pair of indentations) formed on opposite portions of the outer surface 27 of the double-walled structure 20. It is to be understood, however, the number of indentations 50 provided on the outer surface 27 may be modified. For instance, a single indentation 50 may be formed in the double-walled structure 20. According to an aspect, 3, 4, 5, or more indentations 50 may be provided.

As illustrated in FIGS. 1A-1E, FIGS. 3A-3B, FIGS. 4A-4B, FIGS. 6A-6B, FIGS. 6D-6E and FIG. 7, the insulated container 10 further includes an insert structure/vessel/container, such as a glass structure 30. While the term glass structure 30 may be used generally herein, it should be understood that in other similar embodiments, which are included within the scope of disclosure herein, the insert vessel may be or include some material other than glass.

The glass structure 30 is configured for receiving food and beverage therein (e.g. within a hollow interior cavity of the glass structure), so that the food and beverage does not contact the double-walled structure 20. The glass structure 30 is dimensioned to be removably arranged within the hollow interior 28 of the double-walled structure 20. When arranged and secured within the double-walled structure 20, the glass structure 30 may be protected from breakage, which may occur if a glass vessel slips and falls from a user's hands. According to an aspect, the glass structure has a length L3 that is less than (see, for instance, FIG. 6D) or substantially the same as (not shown) the length L1 of the double-walled structure 20.

Figure 6E:
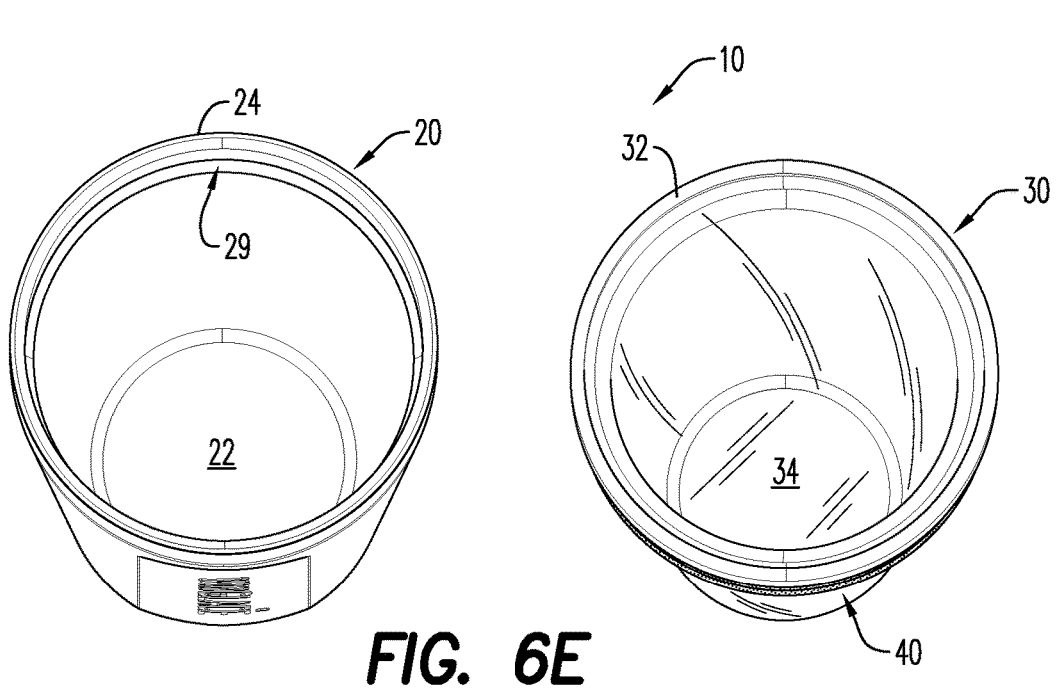
FIG. 6E is a top down, perspective view of the insulated container of FIG. 6D.
Figure 6F:
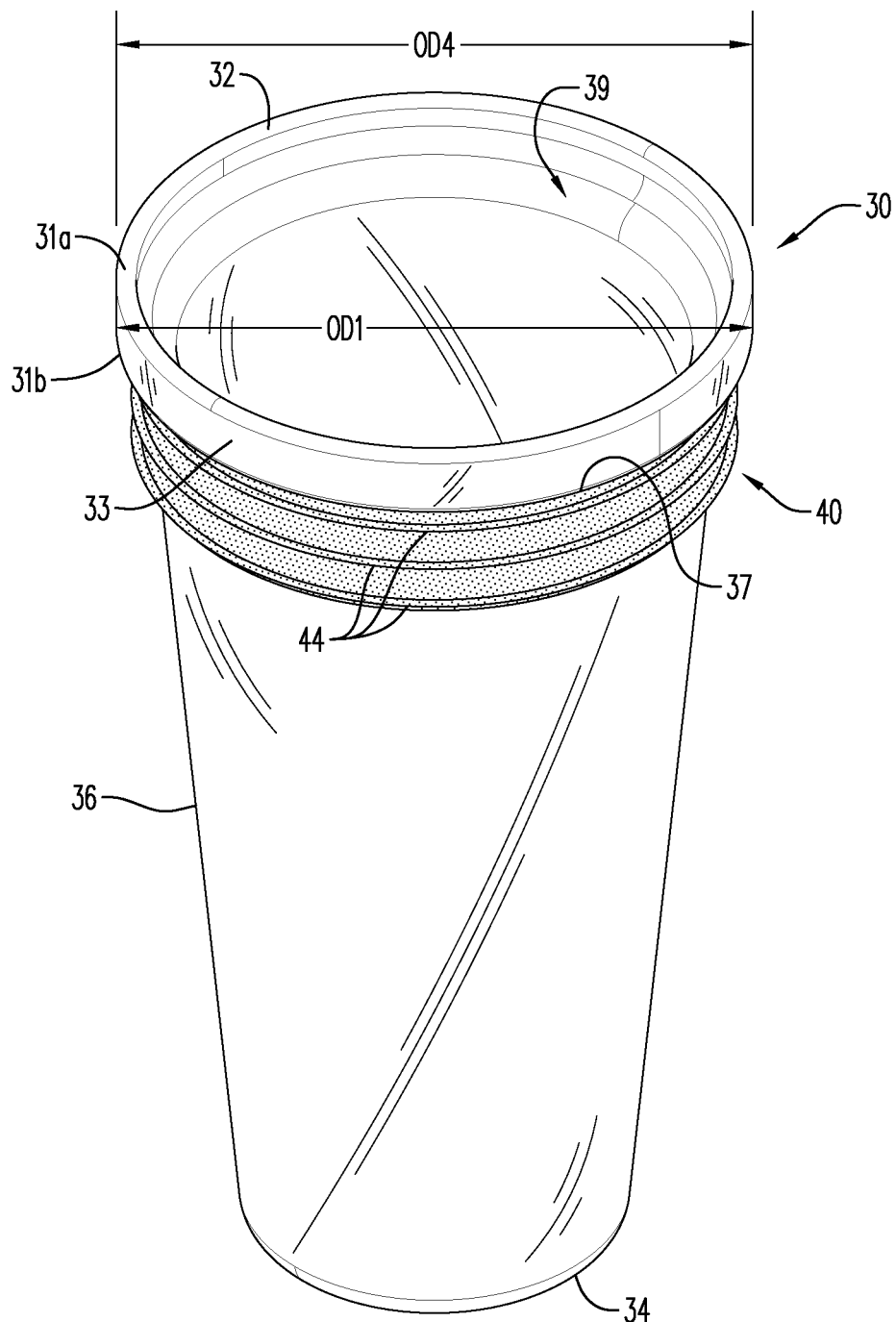
FIG. 6F is a side, perspective of a glass structure of the insulated container of FIG. 6D.

According to an aspect, the glass structure 30 includes a body 36 having an open upper end 37 and a base end (second end or closed end) 34. The body 36 may be formed with a variety of shapes that facilitate arrangement of the glass structure 30 within the double-walled structure 20. According to an aspect and as illustrated in FIG. 6D-6F, the body 36 may taper from the upper end 37 towards the base end 34, such that the body 36 has a frustoconical shape. In an embodiment and as illustrated in FIG. 6A, the body 36 is configured as a substantially cylindrical structure. The dimensions of the glass structure 30, and its upper end 37, range from amounts effective for retaining food and/or beverage within the glass structure 30, and removing the food and/or beverage therefrom.

Figure 8:
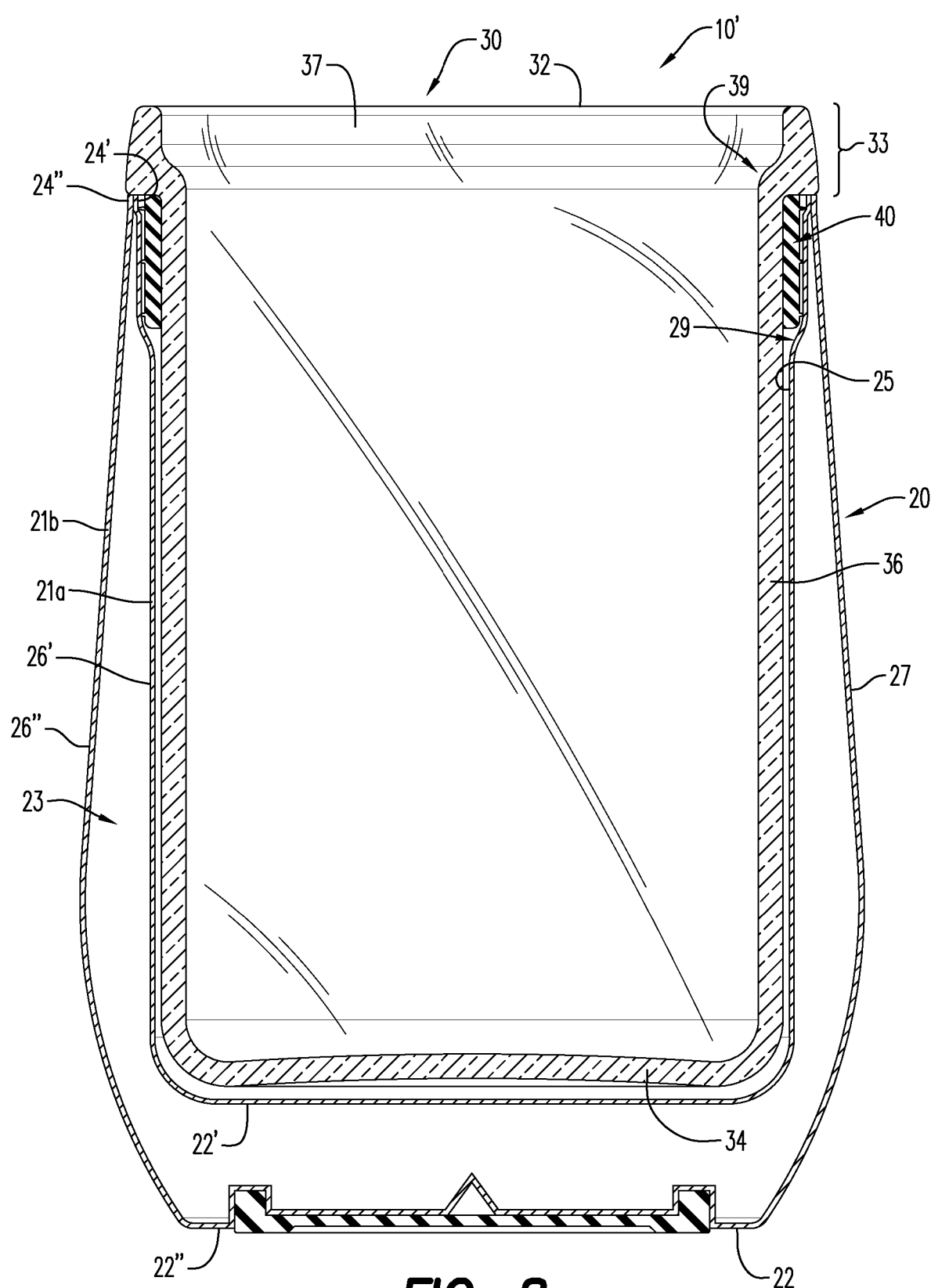
FIG. 8 is a cross-sectional view of a vacuum-insulated container including inner and outer containers, according to an embodiment.

The glass structure 30 further includes a sipping portion 32 extending from the open upper end 37 of the body 36. According to an aspect and as illustrated in FIG. 1C, FIGS. 3A-3B, FIGS. 4A-4B, FIGS. 6A-6B, and FIGS. 6D-6F, the sipping portion 32 includes a shoulder 31b, a sipping end 31a, and a side wall 33 extending between the sipping end 31a and the shoulder 31b. According to an aspect, the side wall 33 extends around the upper end 37 of the glass structure 30. The side wall 33, including the shoulder 31b protrudes from the upper end 24 of the double-walled structure 20. According to an aspect and as illustrated in FIG. 6F, the side wall may be substantially straight/linear. In an embodiment, the side wall 33 of the sipping portion 32 flares outwardly, with an outer diameter OD4 of the sipping end 31a being greater than an outer diameter OD1 of the shoulder 31b. According to an aspect, the sipping portion 32 flares inwardly, with the outer diameter OD4 of the sipping end 31a being less than the outer diameter OD4 of the shoulder 31b. According to an aspect and as illustrated in FIGS. 7-8, the side wall 33 is outwardly bowed/curved, which may enhance a user's comfort when drinking or sipping from the container 10. According to an aspect, the outer diameter of both the sipping end 31a and the shoulder 31b may be greater than the outer diameter of the body of the glass structure 30.

As illustrated in FIG. 6F, the shoulder 31b of the sipping portion 32 is seated on top of the open end 24 of the double-walled structure 20. The sipping end 31a of the sipping portion 32 extends away from the open end 24, thereby preventing users from directly contacting their lips to the double-walled structure 20. This may eliminate or substantially reduce the risk that users will directly contact their lips with the material used to make the double-walled structure (such as metallic materials).

The glass structure 30 further includes an outer diameter OD2 along the body 36, extending from the upper end 37 to the base end 34. According to an aspect the outer diameter OD2 of the body 36 is less than the outer diameters OD1, OD4 of the sipping and shoulder ends 31a, 31b of the sipping portion 32. The outer diameter OD2 of the body 36 may be less than a first inner diameter ID2 of the double-walled structure 20, so that the body 36 of the glass structure 30 can be disposed in the hollow interior 28 of the double-walled structure 20, with only the sipping portion 32 outwardly extending therefrom. According to an aspect, when the glass structure 30 is disposed in the hollow interior 28 of the double-walled structure 20, a total length L2 of the container 10 is greater than the length L1 of the double-walled structure 20.

As illustrated in FIG. 1A, FIG. 1D and FIG. 6F, the glass structure 30 may further include one or more stepped interior portions (recesses or contours) 39 at the sipping portion 32. The stepped interior portion 39 is formed in the inner surface of the glass structure 30. The stepped interior portion 39 may aid in enhancing a user's comfort when drinking from the container.

As illustrated in FIGS. 3A-3B, FIGS. 4A-4B, FIGS. 6A-6B, and FIGS. 6D-6E, the insulated container 10 further includes a deformable flange 40. The deformable flange 40 is positioned around the body 36 of the glass structure 30, so that when the glass structure 30 is positioned within the hollow interior 28 of the double-walled structure, the deformable flange 40 is compressed between the glass structure 30 and the inner surface 25 of the double-walled structure. The deformable flange 40 may help to protect the glass structure 30 from breaking when the glass structure 30 is secured in the double-walled structure 20 by the deformable member 40.

According to an aspect, the inner surface 25 of the double-walled structure 20, along the stepped portion 29, includes a plurality of ribs (not shown) that receive the protrusions 44 of the deformable flange 40. This may help facilitate a semi-permanent attachment of the double-walled structure 20 to the glass structure 30.

Figure 4A:
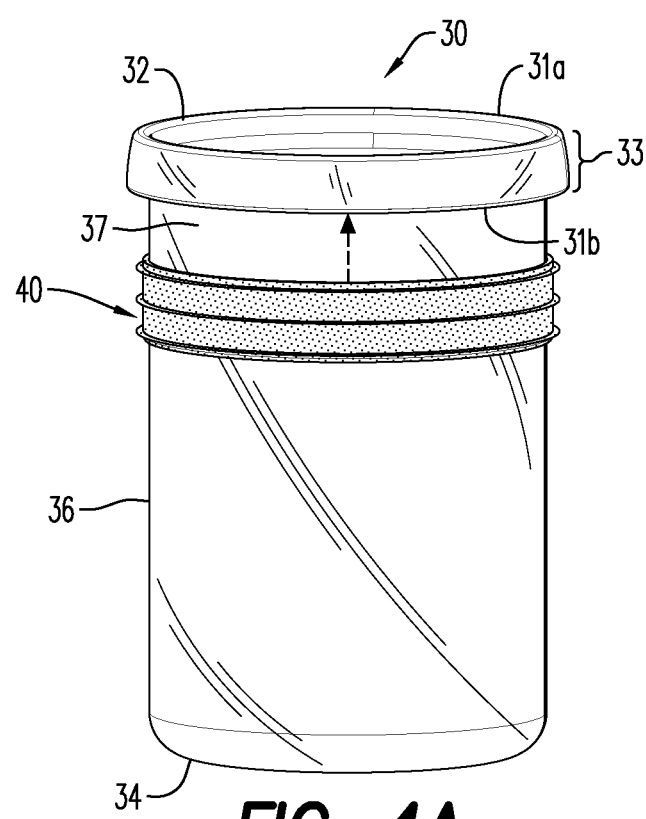
FIG. 4A is a perspective view of a flange positioned on a glass structure of the insulated container of FIG. 2.
Figure 4B:
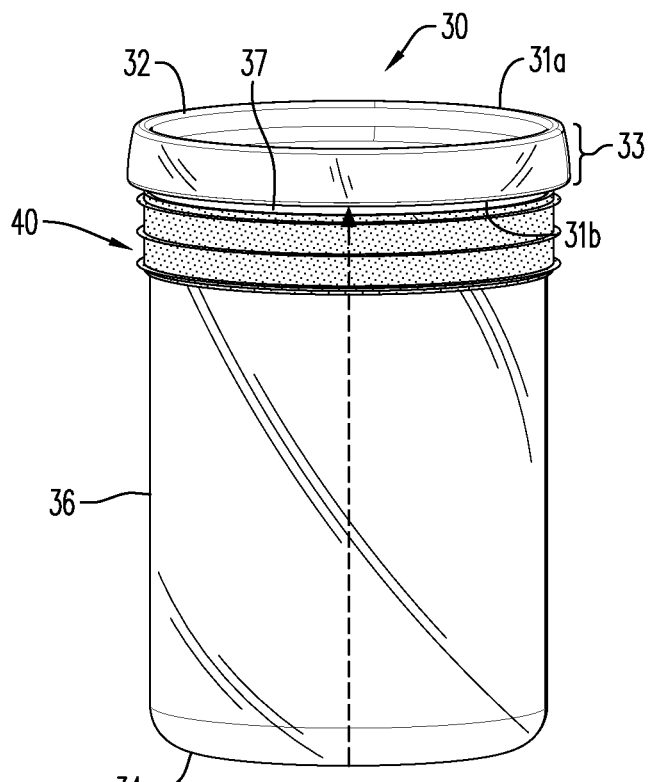
FIG. 4B is another perspective view of a flange positioned on a glass structure of the insulated container of FIG. 2.

FIGS. 4A-4B and FIGS. 6A-6B, 6D and 6F illustrate the generally positioning of the deformable flange 40. The deformable flange 40 may be positioned on the glass structure 30 from the second end, and moved up towards the shoulder end 31b of the sipping portion 32. FIG. 4A illustrates the deformable flange 40 extending around the body 36 of the glass structure 30 in a spaced apart configuration from the sipping portion 32. As illustrated in FIGS. 4B, 6A-6B, 6D and 6F, the deformable flange 40 may be positioned adjacent the shoulder end 31b of the sipping portion 3230.

FIGS. 5A-5D illustrate the deformable flange 40 in more detail. The deformable flange 40 includes a main body 42 that is able to conform to the shape of the glass structure 30. In an embodiment, when positioned around the body 36 of the glass structure 30, the deformable flange 40 has a generally cylindrical (FIG. 6A) or a generally conical or frustoconical shape (FIGS. 6D and 6F).

Figure 5A:
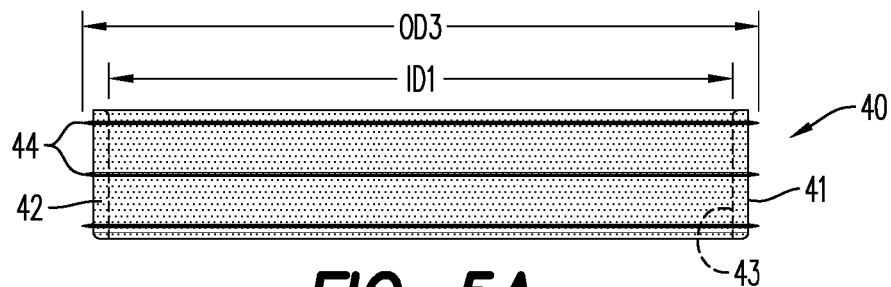
FIG. 5A is a side view of a flange of the insulated container of FIG. 2.
Figure 5B:
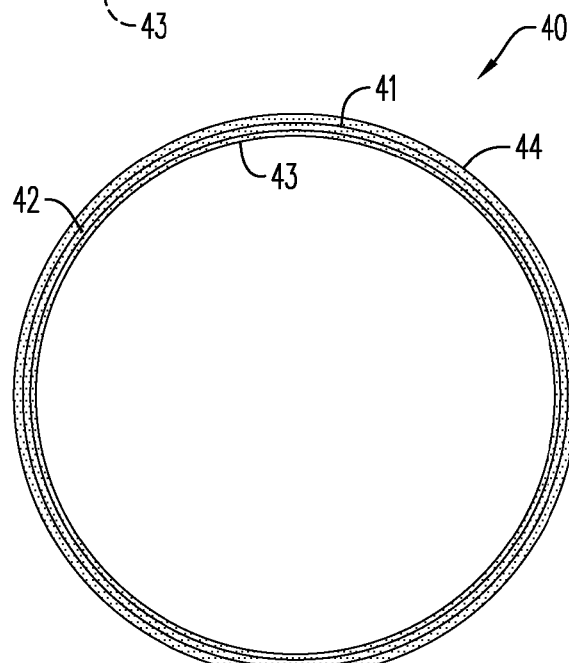
FIG. 5B is a top view of the flange of FIG. 5A.
Figure 5C:
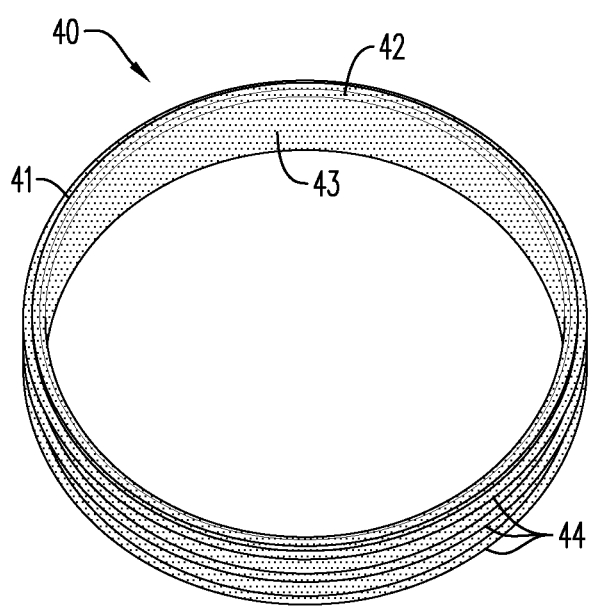
FIG. 5C is a top, perspective view of the flange of FIG. 5A.
Figure 5D:
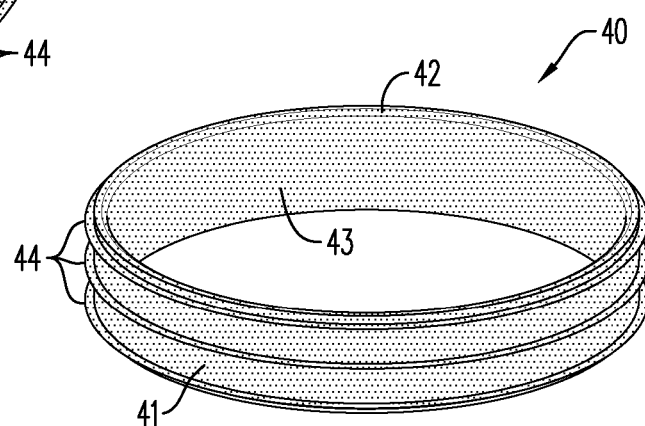
FIG. 5D is a side, perspective view of the flange of FIG. 5A.

It is contemplated that the deformable flange 40 may be secured to the glass structure 30 by a friction fit. Additional securing mechanisms may be provided on surfaces of the deformable flange 40 to aid with securing the flange 40 onto to the glass structure 30 and to double-walled structure 30. According to an aspect, an inner surface 43 of the deformable flange 40 includes a plurality of threads for engaging with corresponding threads formed on the body 36 of the glass structure 30 (not shown). As illustrated in FIG. 5B, FIG. 5C and FIG. 5D, the inner surface 43 of the deformable flange is smooth, which may facilitate ease of placement around the body 36 of the glass structure 30. The threads of the deformable flange 40 and optionally, the threads on the body 36 of the glass structure 30, may be one of continuous threads or interrupted threads. As used herein, "continuous threads" may mean a non-interrupted threaded closure having a spiral design (e.g., extending around the skirt like a helix), while "interrupted threads" may mean a non-continuous/segmented thread pattern having gaps/discontinuities between each adjacent thread.

According to an aspect and as illustrated in FIGS. 5A-5D, the threads may be a plurality of protrusions 44 that extend from an outer surface 41 of the body 42. The plurality of protrusions may be continuous/uninterrupted (i.e., formed contiguously around the main body 42 of the flange 40. According to an aspect and as illustrated in FIGS. 5B-5D, the protrusions 44 may be interrupted (i.e., having multiple segments, or the protrusions 44 being spaced apart from each other, that extend generally around a circumference of the body 42).

The protrusions 44 of the deformable flange 40 are flexible and engage the inner surface 25 of the double-walled structure 20. According to an aspect, the deformable flange 40 engages the inner surface 25 of the double-walled structure 20, at the stepped portion 29. The deformable flange 40 may be composed of any material that is flexible, and may be repeatably compressed and/or is able to maintain compression for an extend period of time. According to an aspect, the deformable flange 40 is composed of at least one of rubber, plastic, and silicone. The deformable member may be made by formed by an injection molding process, or in any other suitable manner.

The deformable flange 40 has an inner diameter ID1 and an outer diameter OD3. The inner diameter ID1 of the deformable flange 40 may be substantially the same size as, or slightly less than, the second diameter OD2 of the body 36 of the glass structure 30. This allows the deformable flange to be secured to the body 36 without slipping off. According to an aspect, the outer diameter OD3 of the deformable flange 40, includes the protrusions 44, and is greater than the inner diameter ID2 of the double-walled structure 20. When the deformable flange 40 is secured to the glass structure 30, and the glass structure 30 including the deformable flange is arranged in the hollow interior 28 of the double-walled structure 20, the deformable flange 40 is compressed between the inner surface 25 of the double-walled structure 20 and the glass structure 20. In some embodiments, the plurality of protrusions 44 may include a first layer of protrusions and a second layer of protrusions, for example spaced apart on the main body. In some embodiments, the first layer may be located in proximity to the shoulder and the second layer may be distal to the shoulder (e.g. at the bottom of the main body). In some embodiments, the first layer may be configured to more securely removably retain than the second layer. N some embodiments, the protrusion of the first layer may have less interrupts than the protrusion of the second layer.

Figure 3A:
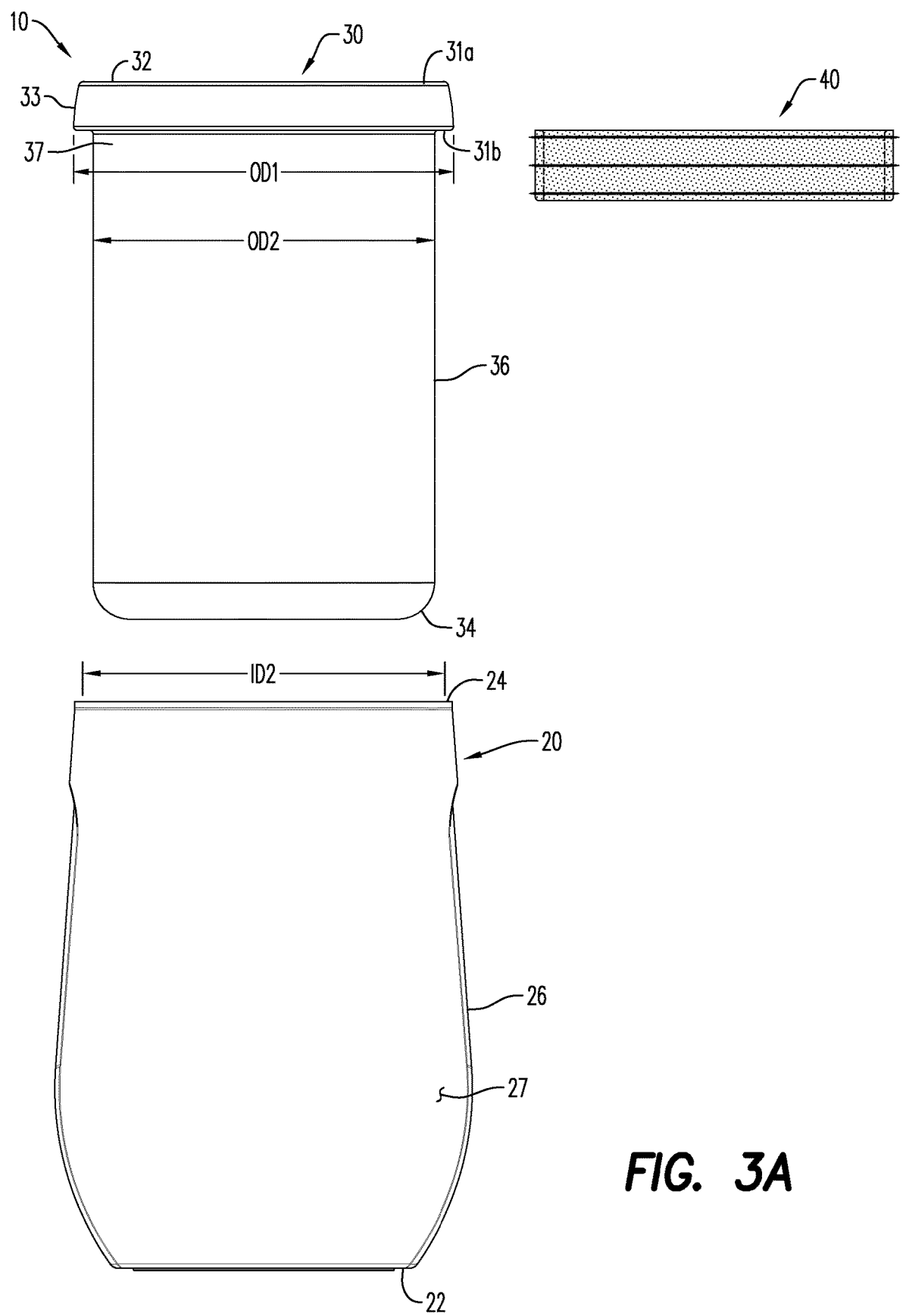
FIG. 3A is an exploded view of an insulated container including a deformable flange, according to an embodiment.
Figure 3B:
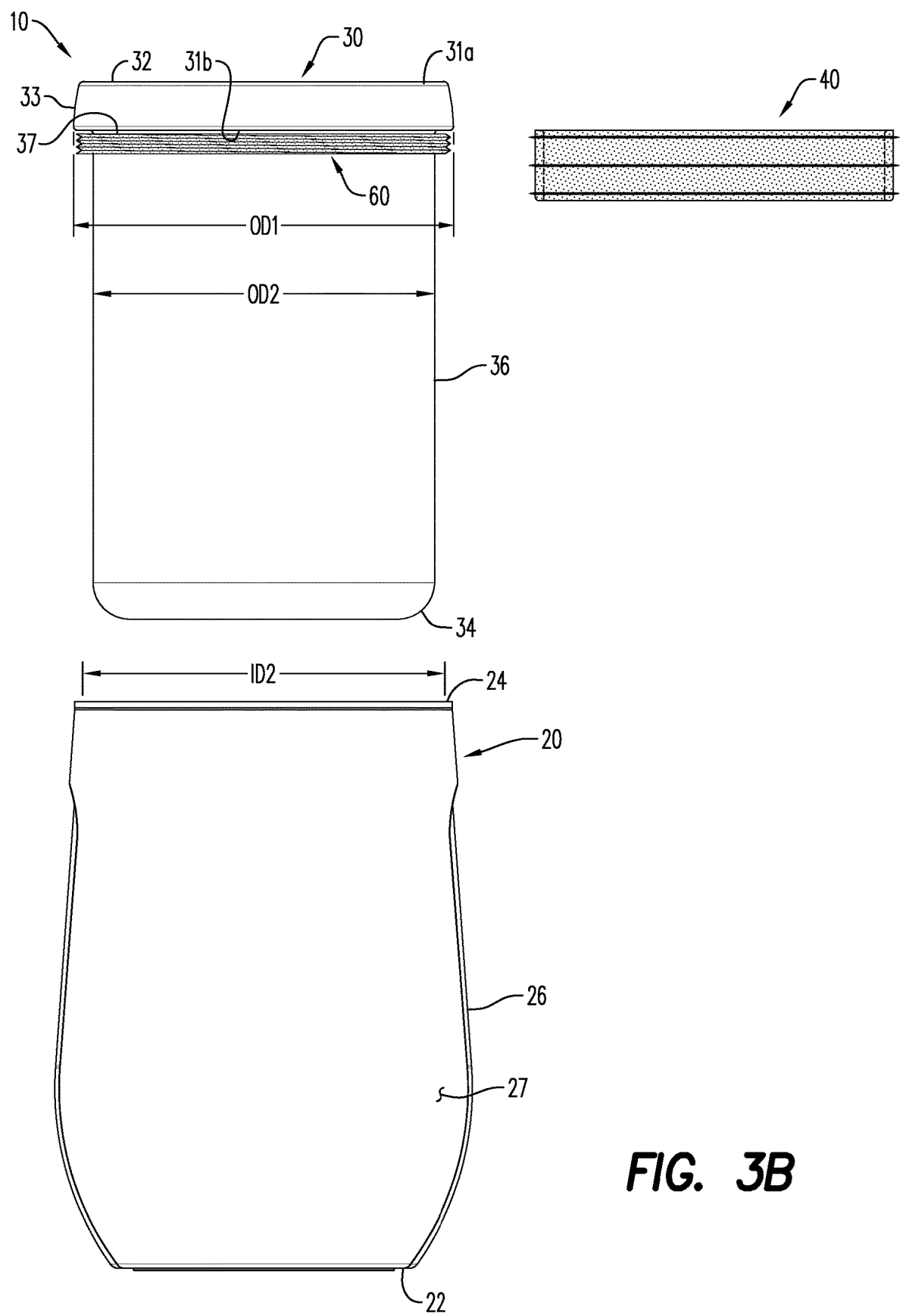
FIG. 3B is a partial perspective and exploded view of an insulated container including a gasket, according to an embodiment.

According to an aspect and as illustrated in FIG. 3B, the container 10 includes a gasket 60. The gasket 60 may be secured between the glass structure 30 and the double-walled structure 20. The gasket 60 engages with the inner surface 25 of the double-walled structure 20, at the stepped portion 29, and the body 36 of the glass structure 30, adjacent the lip portion 33. The gasket 60 may be utilized with or without the deformable flange 40 positioned between the structures 20, 30. According to an aspect, when the container 10 includes the gasket 60 and the deformable flange 40, the gasket 60 is adjacent the lip portion 33 of the glass structure 30, and the deformable flange 40 is adjacent the gasket 60, such that the gasket 60 is sandwiched between the shoulder portion 31b of the sipping portion 32 of the glass structure 30 and the deformable flange 40.

Figure 3C:
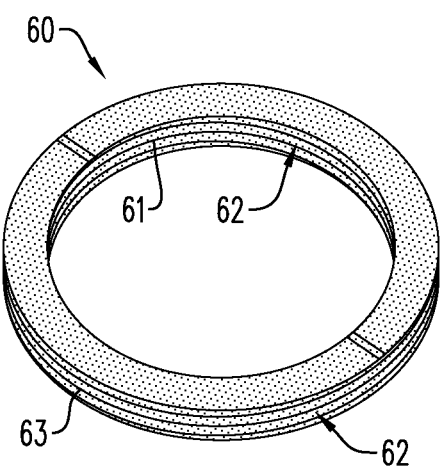
FIG. 3C is a perspective view of the gasket of FIG. 3B.

The gasket 60 may help secure the glass structure 30 to the double-walled structure 20. According to an aspect and as illustrated in FIG. 3C, the gasket 60 includes a plurality of threads 62 extending along at least one of its inner 61 surface and outer surface 63. The threads 62 may be continuous threads or interrupted threads, selected, at least in part, on the corresponding threads formed on at least one of the body 36 of the glass structure 30 and the inner surface of the double-walled structure (at the stepped portion). The gasket may be dimensioned similar to the deformable flange 40, described hereinabove, with inner and outer diameters that facilitate its ability to seal areas between the glass structure 30 and the double-walled structure 20, as well as secured the glass and double-walled structures 30, 20 together.

According to an aspect, the gasket 60 helps seal against the introduction of food contents and fluids in areas between the glass structure 30 and the double-walled structure 20. The gasket 60 may help to absorb vibration around the glass structure 30, and prevent the glass structure 30 from breaking in the event that the container 10 falls from a surface or out of a user's hands. The gasket 60 may be formed from plastic, silicone, rubber, or any type of material that provides sealing and shock absorption properties. According to an aspect, the gasket 60 may be positioned between the shoulder end 31b of the sipping portion 32 and the deformable member 40.

Embodiments of the disclosure are further directed to a vacuum-insulated container 10'. The vacuum-insulated container/insulated container 10' may be configured substantially as described hereinabove with respect to FIGS. 1A-3B, 6A-7 and 9A-9B.

As shown in FIG. 8 and according to an aspect, the vacuum-insulated container 10' includes an inner container 21a (e.g. forming the inner wall) of the double-walled structure, and an outer container 21b (e.g. forming the outer wall of the double-walled structure) spaced apart from the inner container 21a (e.g. the inner and outer containers 21a, 21b may jointly function as the double-walled structure 20 described hereinabove and illustrated in FIGS. 1-3B, 6A, 6B and 7). For example, the inner container 21a may be sealingly attached to the outer container 21b at their open ends, to form a sealed rim of the vacuum-insulated container 10'. The inner and outer containers 21a, 21b may both be formed of a metal, such as stainless steel. A plurality of indentations 50, substantially as described hereinabove and illustrated in FIG. 7 may be formed in an external surface 27 of the outer container 21b. The indentations 50 facilitate a comfortable use of the vacuum-insulated container 10'. The inner container 21a has a generally cylindrical shape, while the outer container 21b has is contoured so that it is generally bell-shaped. A gap 23 is formed between the inner and outer containers 21a, 21b. The gap 23 between is devoid of air by virtue of creating a vacuum between the inner and outer containers 21a, 21b. The created vacuum reduces the number of molecules present in the gap 23 that could potentially transfer heat by conduction.

Each of the inner and outer containers 21a, 21b includes a closed end 22', 22" and an open end 24', 24". A side wall 26', 26" extends between each of the respective closed ends 22', 22" and respective open ends, 24', 24" of the containers 21a, 21b. The inner container 21a and the outer container 21b are coupled and sealed along their respective open ends 24', 24" so that external air is prevented from passing through the seal and into the gap 23. For example, the seal between the open end of the inner container 21s and the open end of the outer container 21b may form a sealed rim of the double-walled structure. This may retard the transference of heat by conduction and/or convection, so that food particulates and/or beverages positioned in vacuum-insulated container 10' do not gain or lose heat.

The inner container 21a includes at least one stepped portion 29 formed in its inner surface 25. As described hereinabove with respect to the double-walled structure 20, the stepped portion 29 partially extends from the open end 24' towards the closed end 22 of the inner container 21a. The stepped portion 29 is configured for engaging at least one of a deformable flange 40 and a gasket 60, which secures a glass structure 30 that is inserted into the inner container 21a. The deformable member 40 and gasket 60 may be configured substantially as described hereinabove and illustrated in FIGS. 3C and 5A-5D. According to an aspect, the inner container 21a includes a first inner diameter ID2 along the stepped portion 29, and a second inner diameter ID3 extending from the stepped portion 29 to the closed end 22'. The first inner diameter ID2 is greater than the second inner diameter ID3, which facilitates the positioning/placement of the deformable flange 40 and/or the gasket 60 adjacent the stepped portion 29.

The vacuum-insulated container 10' further includes a glass structure 30 arranged within a hollow interior 28 of the inner container 21a, and the deformable flange 40 circumferentially extending around the glass structure 30. In this embodiment, the glass structure 30 is similar to the glass structure 30 illustrated in FIGS. 1A-1E, FIGS. 3A-3B, FIGS. 4A-4B, FIGS. 6A-6B, and FIGS. 6D-6F, and described hereinabove. Thus, for purposes of convenience and not limitation, the various features, attributes, and properties, and functionality of the glass structure 30 and the deformable flange 40 discussed in connection with FIGS. 1A-1E, FIGS. 3A-3B, FIGS. 4A-4B, FIGS. 6A-6B, and FIGS. 6D-6F are not repeated here.

The glass structure 30 is dimensioned to partially fit in the inner container 21a of the vacuum-insulated container 10', with its sipping portion 32 extending from the hollow interior 28 of the inner container 21a. As illustrated in FIG. 8, the shoulder end 31b of the sipping portion 32 extends over the respective open ends 24', 24" of the containers 21a, 21b. It is contemplated that the upper end 37 of the body 36 of the glass structure 30 may be secured to the open ends 24', 24", at least in part by the deformable flange 40 extending around the circumference of the glass structure 30 and being secured at the stepped portion 29 of the inner container 21a.

According to an aspect, the outer diameter OD2 of the body 36 of the glass structure 30 is less than the first inner diameter ID2 of the inner container 21a, which helps to ensure that the body 36 may be received in the inner container 21a. According to an aspect the outer diameter OD2 of the body 36 is less than the outer diameters OD1, OD4 of the sipping and shoulder ends 31a, 31b of the sipping portion 32. The shoulder portion 31b may be seated at the open ends open end 24', 24" of the inner and outer containers 21a, 21b.

The plurality of protrusions 44 of the deformable flange 40 engage the inner surface 25 of the inner container 21a, and helps to retain the glass structure 30 within the hollow interior 28. According to an aspect, when the outer diameter OD3 of the deformable flange 40 is greater than the inner diameter ID2 of the inner container 21a, the deformable flange 40 is compressed between the body 36 of the glass structure 30 and the inner surface 25 of the inner container 21a, which may help secure the inner container 21a, the deformable flange, and the glass structure 30 together.

Figure 10A:
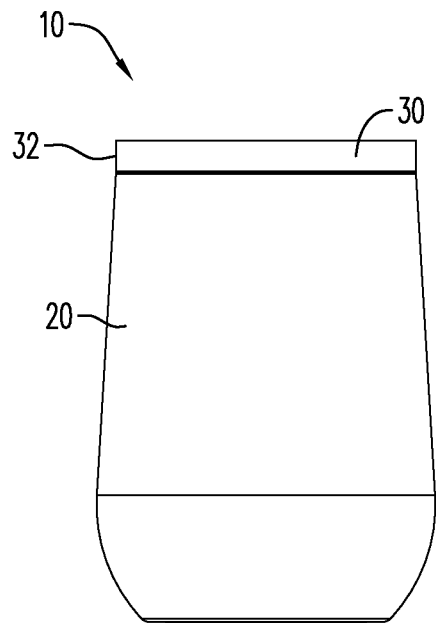
FIG. 10A illustrates in side elevation view an exemplary insulated container, for example configured as a wine container (and in this embodiment, the insulated container may be symmetrical about its longitudinal axis, so that all side views are essentially the same)
Figure 10B:
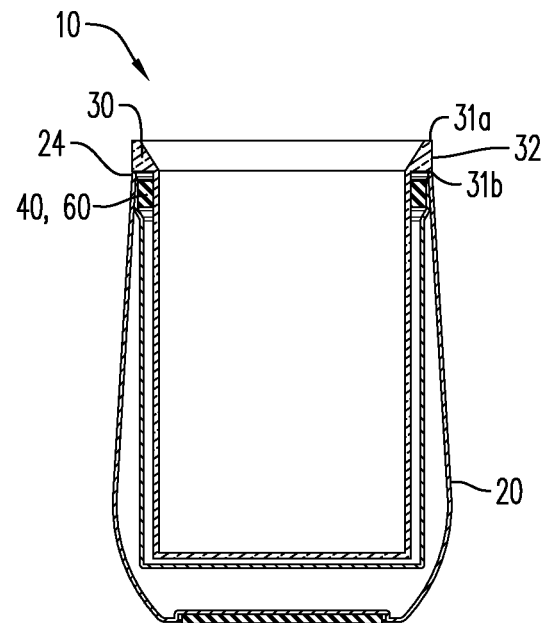
FIG. 10B illustrates a cross-sectional view of the insulated container of FIG. 10A, showing an exemplary glass insert disposed within an exemplary insulated outer vessel (such as a double-walled outer vessel)
Figure 10C:
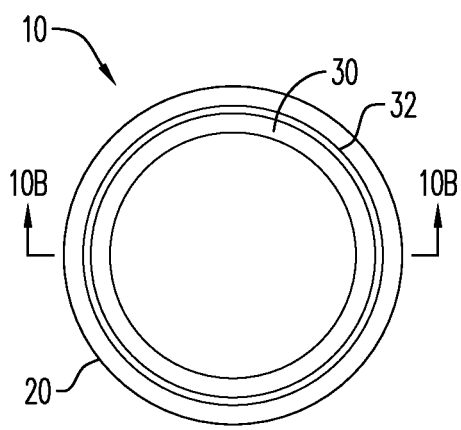
FIG. 10C illustrates a top plan view of the insulated container of FIG. 10A.
Figure 10D:
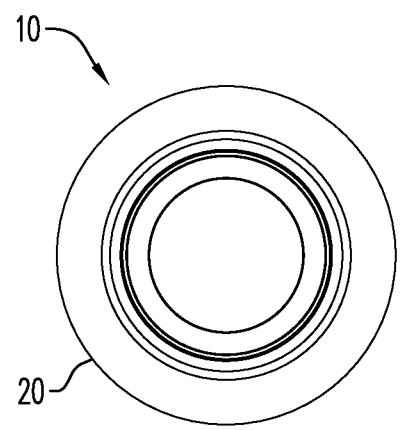
FIG. 10D illustrates a bottom plan view of the insulated container of FIG. 10A.
Figure 10E:
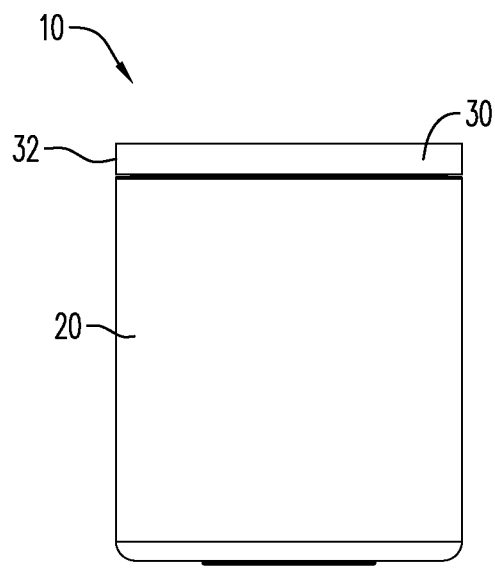
FIG. 10E illustrates in side elevation view another exemplary insulated container, for example configured as a whiskey container (and in this embodiment, the insulated container may be symmetrical about its longitudinal axis, so that all side views are essentially the same)
Figure 10F:
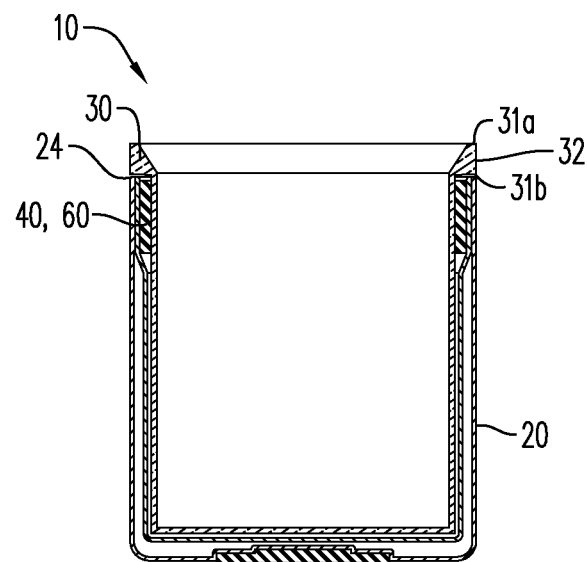
FIG. 10F illustrates a cross-sectional view of the insulated container of FIG. 10E.
Figure 10G:
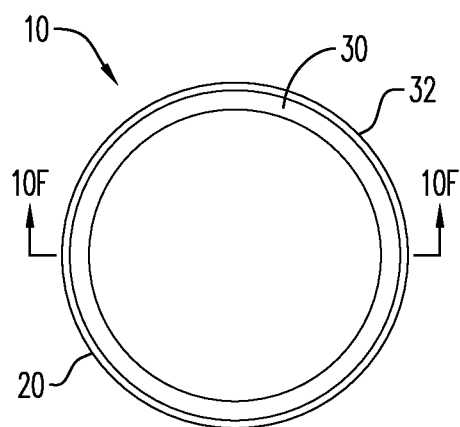
FIG. 10G illustrates a top plan view of the insulated container of FIG. 10E.
Figure 10H:
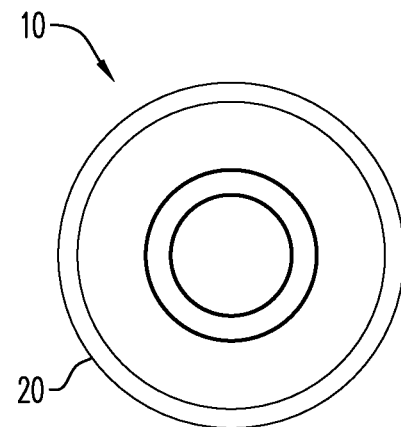
FIG. 10H illustrates a bottom plan view of the insulated container of FIG. 10E.
Figure 10I:
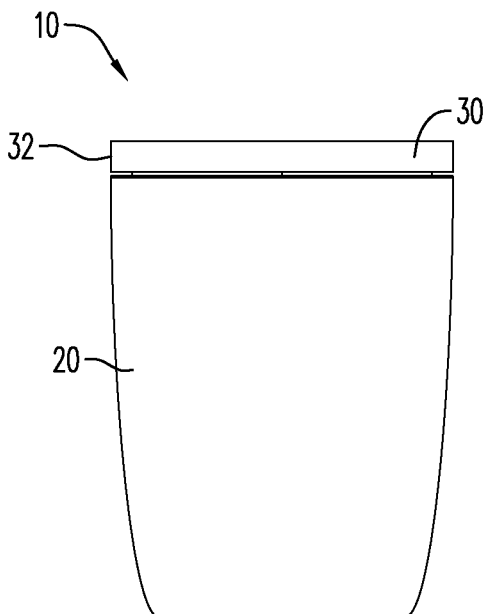
FIG. 10I illustrates in side elevation view another exemplary insulated container, for example configured as a utility container (and in this embodiment, the insulated container may be symmetrical about its longitudinal axis, so that all side views are essentially the same)
Figure 10J:
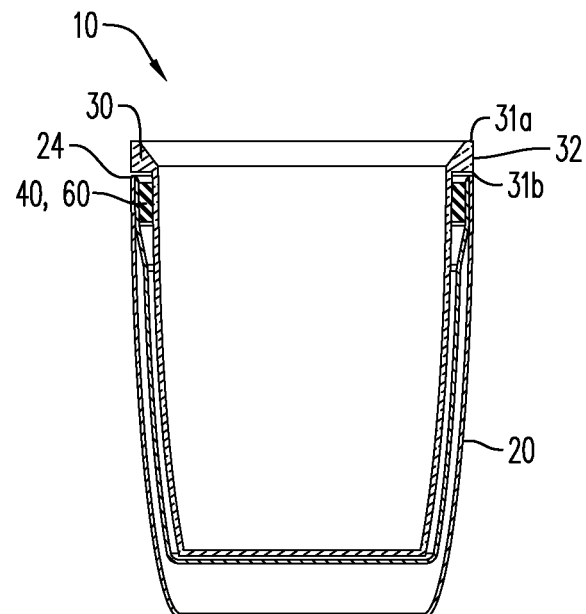
FIG. 10J illustrates a cross-sectional view of the insulated container of FIG. 10I.
Figure 10K:
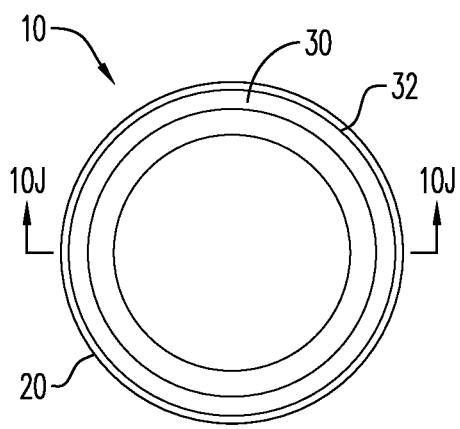
FIG. 10K illustrates a top plan view of the insulated container of FIG. 10I.
Figure 10L:
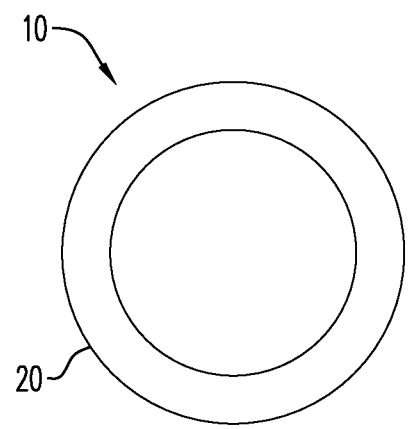
FIG. 10L illustrates a bottom plan view of the insulated container of FIG. 10I.
Figure 10M:
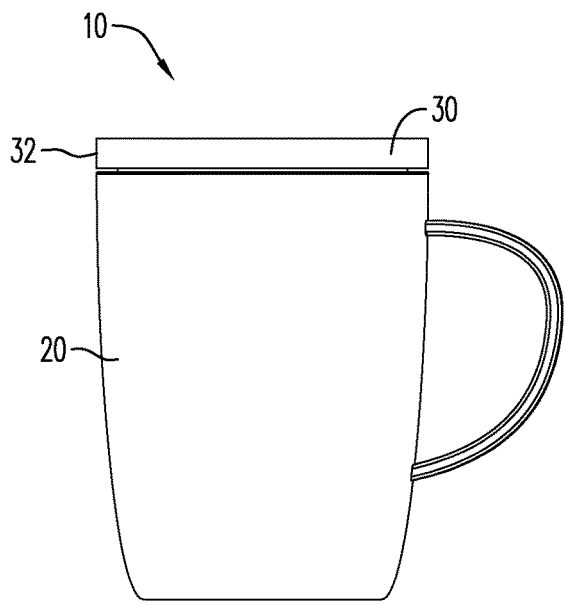
FIG. 10M illustrates in side elevation view another exemplary insulated container, for example configured as a coffee mug (and in this embodiment, except for the handle, the insulated container may be symmetrical about its longitudinal axis, so that all side views are essentially the same—the handle in this embodiment is symmetrical when viewed from opposite sides)
Figure 10N:
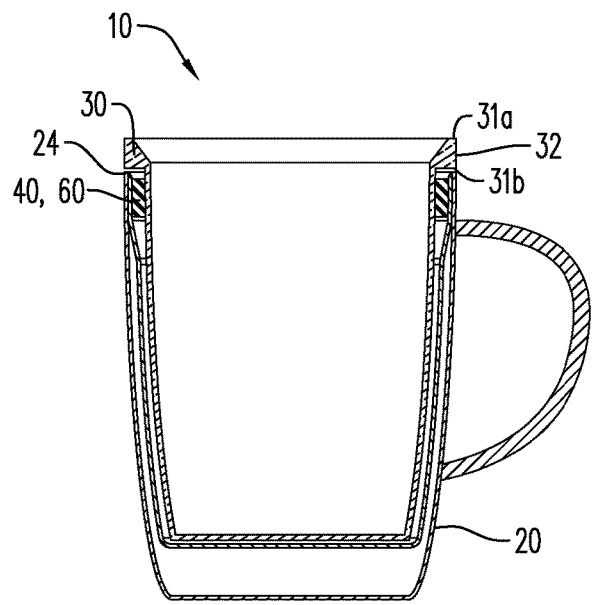
FIG. 10N illustrates a cross-sectional view of the insulated container of FIG. 10M.
Figure 10P:
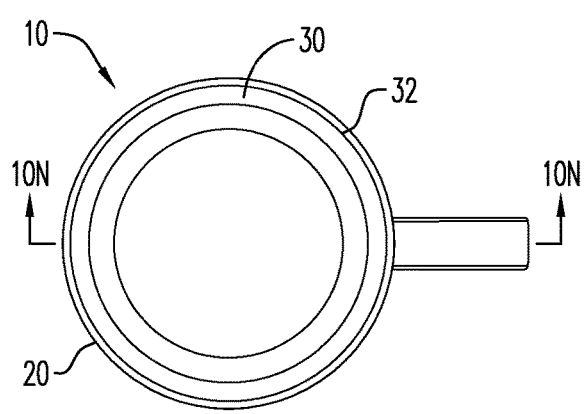
FIG. 10P illustrates a top plan view of the insulated container of FIG. 10M.
Figure 10Q:
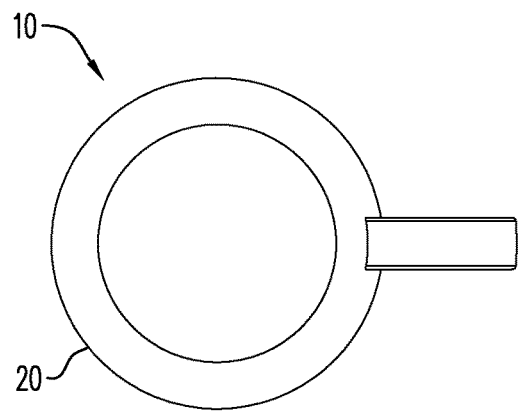
FIG. 10Q illustrates a bottom plan view of the insulated container of FIG. 10M.
Figure 11A:
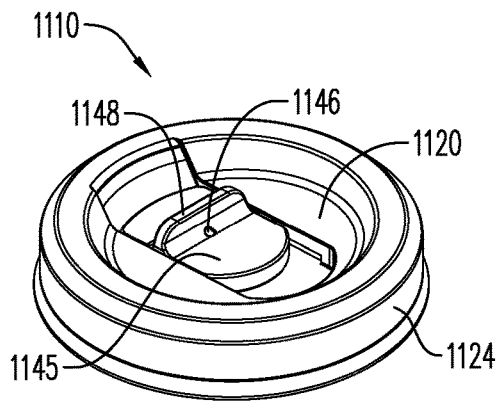
FIG. 11A illustrates a top perspective view of an exemplary pool-safe lid.
Figure 11B:
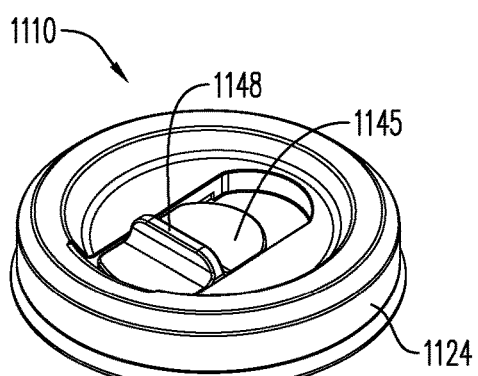
FIG. 11B illustrates another top perspective view of the lid of FIG. 11A.
Figure 11C:
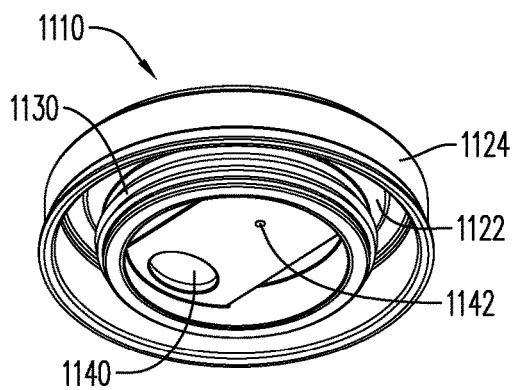
FIG. 11C illustrates a bottom perspective view of the lid of FIG. 11A.
Figure 11D:
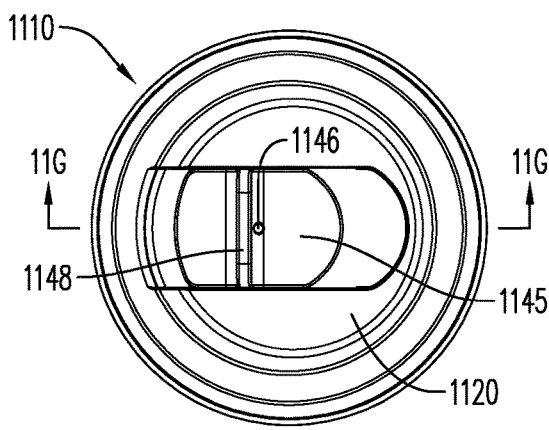
FIG. 11D illustrates a top plan view of the lid of FIG. 11A.
Figure 11E:
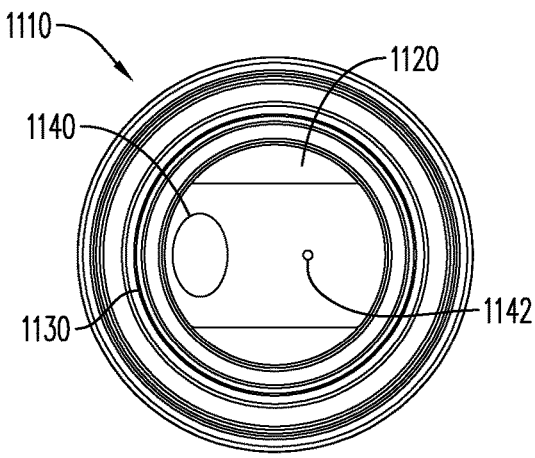
FIG. 11E illustrates in bottom plan view the lid of FIG. 11A.
Figure 11F:
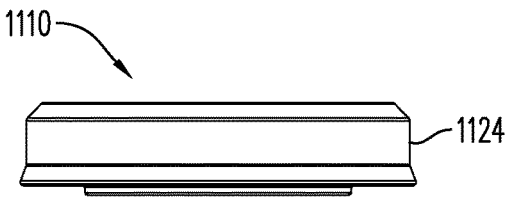
FIG. 11F illustrates a side elevation view of the lid of FIG. 11A (and in this embodiment, all side views are essentially identical)
Figure 11G:
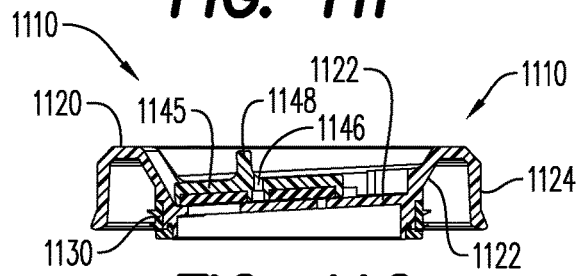
FIG. 11G illustrates a cross-sectional view of the lid of FIG. 11A.

As shown in FIGS. 10A-Q, the glass structure 30 may have a sipping portion 32 configured to be seated upon and/or having a shoulder end 31b directly contacting the sealed rim 24 of the double-walled outer container 20. In the embodiments shown in FIG. 10B, the outer diameter of the sipping portion 32 may be constant extending along the length of the sipping portion 32 from the shoulder end 31b to the sipping end 31a. In other embodiments, the outer diameter of the sipping portion 32 may vary, for example with the sipping end 31a having a different outer diameter than the shoulder end 31b (as illustrated in FIG. 8, for example). In some embodiments, the outer diameter of the sipping portion 32 may be approximately equal to the outer diameter of the double-walled outer container 20 (e.g. at the open end/sealed rim), such that when the sipping portion 32 is seated atop the sealed rim 24 of the double-walled container 20, a continuous outer surface spans between the double-walled container 20 and the glass structure 30 (e.g. the sipping end and the shoulder end exterior may be vertically flush with the exterior of the double-walled outer container 20). In some embodiments, the outer diameter of the sipping portion 32 (e.g. both the shoulder end and the sipping end) may be no less than the outer diameter of the double-walled outer container 20. In other embodiments, the outer diameter of the sipping portion 32 (e.g. the sipping end) may be less than the outer diameter of the double-walled outer container 20.

In some embodiments, and as illustrated in FIGS. 10B, 10F, 10J, and 10N, the inner diameter of the sipping portion 32 may vary or differ from the shoulder end 31b to the sipping end 31a. In some embodiments, the inner diameter of the shoulder end 31b may be less than the inner diameter of the sipping end 31a. In some embodiments, the inner diameter of the sipping portion 32 may vary continuously (e.g. contoured) from the shoulder end 31b to the sipping end 31a. For example, the width of the sipping portion 32 may narrow (as it extends away from the body) from the shoulder end 31b to the sipping end 31a. In some embodiments, the inner diameter may vary linearly from the shoulder end 31b to the sipping end 31a (e.g. the contour between the shoulder end 31b and the sipping end 31a may be linear), for example forming a wedge-shaped (e.g. triangular) cross-section with a wider base at the shoulder end 31b and a narrower sipping end 31a. For example, the wedge-shape cross-section may be approximately a right triangle (e.g. with the right angle located in proximity to the outside of the shoulder end 31b). In some embodiments, the angle of the linear transition from shoulder end 31b to sipping end 31a (e.g. of the inner surface of the sipping portion 32) may be approximately 45 degrees. In other embodiments, the angle of linear transition from shoulder end 31b to sipping end 31a may be approximately 30-60 degrees, 30-45 degrees, or 45-60 degrees. In some embodiments, the narrower sipping end 31a may come to an approximate point/tip cross-section (e.g. the upper vertex of the right triangular cross-section wedge). In some embodiments, the narrower sipping end 31a may come to a narrow flat-top (e.g. as opposed to an actual point or tip), for example no more than ⅓ (or alternatively, ¼, ⅙, ⅛, or ¹⁄₁₀) of the width of the wider base at the shoulder end 31b. In some embodiments, the narrower sipping end 31a may come to a rounded lip outer surface (e.g. a rounded tip).

In some embodiments, the shoulder end 31b of the sipping portion 32 may project outward perpendicular to the open end of the body 36 of the glass structure. In some embodiments, the sipping portion 32 of the glass structure may have a height (e.g. from the shoulder end 31b to the sipping end 31a) approximately equal to the width of the shoulder end 31b (e.g. which rests upon the sealed rim of the double-walled container). In some embodiments, the sipping portion 32 of the glass structure may have a height (e.g. between the shoulder end 31b and the sipping end 31a) of approximately 6 mm and a width of the shoulder end which is approximately 6 mm. In some embodiments, the height of the sipping portion 32 may be less than its width at the shoulder end 31b. In some embodiments, the height of the sipping portion 32 may be greater than its width at the shoulder end 31b. In some embodiments, the height of the sipping portion 32 may be approximately 6 mm, 3-10 mm, 3-6 mm, or 6-10 mm. In some embodiments, the width of the sipping portion at the shoulder end may be approximately 6 mm, 3-10 mm, 3-6 mm, or 6-10 mm. In some embodiments, the transitions between surfaces of the glass structure 30 (e.g. where the shoulder end which extends out perpendicular from the body of the glass structure transitions upward toward the exterior surface of the sipping portion extending towards the sipping end, the tip at the sipping end, and/or where the shoulder end transitions downward to the body of the glass structure) may be beveled, contoured, or rounded (e.g. there may necessarily be some slight curvature, rather than a sharp right angle), and such rounding/curvature at transitions may be discounted in describing the relationship of related elements (e.g. the outer diameter of the shoulder end versus the sipping end).

In some embodiments, the wall thickness of the body 36 of the glass structure 30 may be approximately 1.5 mm. In some embodiments, the inner and/or outer surfaces of the body 36 of the glass structure 30 may be smooth, for example projecting straight downward from the sipping portion and/or without a stepped portion. In some embodiments, the wall thickness of the body 36 of the glass structure 30 may be approximately constant. In some embodiments, the wall thickness of the body 36 of the glass structure 30 may taper continuously. In some embodiments, the inner surface of the double-walled container 20 may include a stepped or recessed portion (e.g. with a larger inner diameter) in proximity to the open end (e.g. sealed rim). The stepped portion may be configured for interaction with the deformable flange located on the outer surface of the glass structure 30, for example allowing effective removable retention. The stepped portion may transition (e.g. angle) towards its bottom end back to a smaller inner diameter, which may serve as a downward stop based on compression of the deformable flange. In some embodiments, the lower portion of the body 36 of the glass structure 30 (e.g. below the stepped portion and/or transition therefrom) may have a substantially constant inner diameter. In some embodiments. Both the body 36 of the insert structure (e.g. the glass structure 30) and the sipping portion 32 may be formed of glass, for example jointly forming a single integral glass insert vessel. As previously noted, in various embodiments included within this disclosure, the insert structure need not be limited to glass (e.g. the insert structure may or may not be or include glass). For example, embodiments (which may be similar to embodiments specifically disclosed herein) may more generally substitute insert structure in place of a specific glass structure, and these embodiments are included within the scope of this disclosure.

As FIGS. 10A-Q illustrate, the outer vessel 20 of the insulated container may have different shapes, proportions, and/or configurations. Similarly, the insert containers 30 (e.g. glass insert structures) may have different shapes, proportions, and/or configurations, which may for example match and/or correspond to relating features of the outer vessel 20. For example, in FIG. 10A the insulated container 10 may be configured as a wine container/glass, in FIG. 10E the insulated container 10 may be configured as a whiskey container/glass, in FIG. 10I the insulated container 10 may be configured as a utility container/beverage cup, and in FIG. 10M the insulated container 10 may be configured as a coffee mug. In embodiments such as shown in FIGS. 10M-Q, the outer vessel (e.g. the double-walled structure 20) may further comprise a handle. For example, the handle may extend from the outer surface of the outer vessel 20 and/or may be configured to provide a grip or holding surface for holding the insulated container 10 (e.g. with a single hand and/or in a mug or coffee-cup fashion). In FIG. 10M, the handle is attached to the exterior sidewall of the outer vessel 20 in two locations (e.g. at the top and bottom of the handle).

FIGS. 11A-G illustrates an exemplary pool-safe lid 1110 configured to removably attach atop an exemplary outer vessel (e.g. a double-walled container) having a removable glass insert structure 30 disposed therein (e.g. with a sipping portion extending out of the open end of the double-walled container and having a shoulder end seated atop the sealed rim of the double-walled container). The lid 1110 has an end plate 1120, an inner skirt 1122 extending from the end plate, and an outer skirt 1124 extending from the end plate. The end plate 1120 may be configured to span and/or be seated atop the sipping end of the sipping portion of the glass structure and/or to span and/or close the open end of the insulated container. While the end plate 1120 may be flat in some embodiments, in other embodiments the end plate 1120 may include raised and/or depressed areas. For example, in FIG. 11 the end plate 1120 includes a depressed central area, with a raised ring in proximity to the exterior periphery. In some embodiments, the inner and outer skirts may include concentric cylindrical elements extending downward from the end plate 1120. The inner skirt 1122 may be configured to extend downward along the inner surface of the sipping portion and a portion of the inner surface of the body open end of the glass structure. The outer skirt 1124 may be configured to extend downward along the outer surface of the sipping portion and a portion of the outer surface of the double-walled container. Thus, when seated, the inner and outer skirts 1122, 1124 of the lid 1110 may encompass (e.g. sandwich) the outer vessel (e.g. outer wall) of the double-walled container, the inner vessel (e.g. inner wall) of the double-walled container, and the glass structure (e.g. the sealed rim of the double-walled container and the sipping portion and the open end of the glass structure). In some embodiments, the lid 1110 may be configured to sandwich the sipping portion of the glass structure between the end plate 1120 of the lid and a rim of the outer vessel and to sandwich the sipping portion of the glass structure between the inner skirt 1122 and the outer skirt 1124 of the lid 1110, thereby encompassing and/or enclosing the sipping portion.

The space between the inner skirt 1122 and the outer skirt 1124 of the lid may correspond to (e.g. matingly fit with and/or form-fitted to) the shape of the sipping portion of the glass structure. For example, the inner surface of the outer skirt 1124 of the lid may have a diameter approximately equal to the outer diameter of the sipping portion. The outer surface of the inner skirt 1122 of the lid may have a diameter that is approximately equal to and/or shaped similar to the inner diameter variation of the sipping portion. For example, for a lid 1110 configured for use on the glass insert of FIG. 10, the outer surface of the inner skirt 1122 may be angled corresponding to the angle of the inner surface of the sipping portion extending from the shoulder end to the sipping end (e.g. smaller at the bottom than at the top in proximity to the end plate). In some embodiments, the outer skirt and/or inner skirt may extend out from the end plate sufficiently to contact the double-walled container when the lid is in place (e.g. atop the sipping portion of the glass structure).

In some embodiments, the lid 1110 may have one or more deformable attachment device (e.g. one or more deformable flange or gasket (e.g. a rubber ring)) 1130 configured to removably attach (e.g. by friction-fit) the lid 1110 onto the sipping portion and/or double-walled container. In some embodiments, the deformable attachment device (e.g. flange or gasket, which may be similar in some embodiments to other flange and/or gasket embodiments described herein) may be mounted on the exterior/outer surface of the inner skirt 1122 and/or may be configured to interact with the inner surface of the glass structure (e.g. body). For example, in FIG. 11G, a deformable gasket may be disposed within a channel on the outer surface of the inner skirt 1122 of the lid and may be configured to removably attach/grip the lid 1110 to the glass structure (e.g. it may be compressed between the inner skirt and the glass structure). In some embodiments, the deformable attachment device 1130 may provide a liquid seal sufficient to prevent liquid in the hollow interior of the glass structure from seeping between the glass structure and the double-walled container during drinking and/or tipping of the insulated container, for example maintaining a clean space therebetween. This may simplify cleaning of the insulated container, for example allowing the outer double-walled container to be used repeatedly without washing while the inner glass structure may be repeatedly removed and cleaned over the course of use. In some embodiments, the upper portion of the body of the glass insert structure may be disposed and/or held between the deformable attachment mechanism (e.g. deformable gasket) of the lid (e.g. which may be disposed on the outer surface of the inner skirt) and the deformable retaining device (e.g. deformable flange and/or gasket) configured to retain the glass insert structure within the outer container (e.g. within the double-walled container).

In other embodiments, the deformable attachment device 1130 may be mounted to the interior surface of the outer skirt 1124 and/or may be configured to interact with the outer surface of the double-walled container (e.g. for removable attachment). Some embodiments may have two deformable attachment devices, for example both of the devices described above, thereby gripping the inner surface of the glass structure and the outer surface of the double-walled container (e.g. to more securely removably attach the lid to the insulated container). In some embodiments, the lower end of the outer skirt 1124 may be configured to be biased inward (e.g. a biased portion configured to press against and/or snap fit onto the exterior of the double-walled container, for example in proximity to the sealed rim). In some embodiments, the lower end of the outer skirt 1124 may include an inward projection configured to enable a friction fit and/or a snap fit onto the sealed rim of the double-walled container. In some embodiments, the inward projection may be deformable. In some embodiments, the lower end of the inner skirt 1122 may be biased outward (e.g. towards contact with the glass structure when the lid is in place on the insulated container). For example, the bias may be sufficient to enable the deformable attachment device 1130 to removably secure the lid 1110 to the insulated container and/or to provide a liquid seal sufficient to prevent liquid in the hollow interior of the glass structure from seeping between the glass structure and the double-walled container during drinking and/or tipping of the insulated container.

The shape/configuration of the space between the inner and outer skirts of the lid (as well as the end plate) may totally enclose the glass sipping portion and extend down into contact with the outer surface/exterior of the double-walled outer container, so that there is no exposed glass of the glass structure. In other words, viewed externally, there would be no exposed or visible glass, and the glass structure would be completely enclosed by the double-walled structure and the lid. The lid 1110 may be configured in some embodiments to protect the sipping portion from breakage and/or to contain (e.g. prevent egress of) any broken glass in the instance of breakage of the glass structure, which may render the insulated container pool-safe. For example, the inward projection and/or deformable attachment device on the interior surface of the outer skirt may grip the outer surface of the double-walled container sufficiently to prevent any glass shards or broken glass (e.g. from the sipping portion) from exiting to the exterior of the container, and/or the deformable attachment device mounted on the exterior of the inner skirt may grip the inner surface of the glass insert structure (e.g. the body) sufficiently to prevent any glass shards or broken glass from the sipping portion from existing into the hollow interior cavity of the glass insert structure. In some embodiments, the lid may be configured to prevent egress of any broken glass (or any broken portion of the insert structure) into the external environment. In some embodiments, the lid may be configured to prevent any broken glass from the sipping portion from interacting with any food or beverage in the hollow interior cavity of the glass insert structure (e.g. to prevent inadvertent contamination of any food or beverage therein by broken glass).

In some embodiments, the lid 1110 may be configured to completely cover the exposed glass of the sipping portion (e.g. projecting out of the double-walled container), so that when attached onto the double-walled container open end, the glass structure is completely enclosed within the double-walled container with the lid attached. For example, the end plate 1120 of the lid may cover the sipping end of the sipping portion of the glass structure, and the outer skirt 1124 may extend down beyond the sipping portion to contact the exterior of the double-walled container. The inner skirt 1122 may extend downward into the open end of the body of the glass structure, which may further help encase the glass structure and/or may help secure the lid onto the joint open end of the double-walled container and the glass structure (e.g. spanning the sealed rim 24 of the double-walled structure plus the sipping portion 32 and the open end of the body of the glass structure). In some embodiments, the end plate 1120 of the lid may be separated from the sealed rim of the double-walled container by the sipping portion of the removable glass structure. For example, the sipping portion may be sandwiched between the end plate of the lid and the sealed rim of the double-walled container. In some embodiments, the end plate of the lid may not directly contact the sealed rim of the double-walled container. In some embodiments, a free end of the outer skirt 1124 and a free end of the inner skirt 1122 may extend from the end plate 1120 approximately the same distance. In other embodiments, the free end of the inner skirt 1122 may extend further from the end plate 1120 than the free end of the outer skirt 1124. It should be understood that, in similar embodiments which are included within this disclosure, any outer container/vessel may be used in the manner described herein with an exemplary glass insert structure and/or lid, regardless of whether the outer vessel is a double-walled container/structure or not.

The lid 1110 may be configured to allow a user to drink without removing the lid from the insulated container (e.g. without exposing the glass structure). For example, the lid 1110 may have an opening 1140 in the end plate 1120 (e.g. passing through the end plate) configured for insertion and use of a straw and/or pouring of liquid out (e.g. sipping/mouth drinking) from the insulated container. The opening 1140 may be located inward of the inner skirt 1122. Some embodiments may also have a small airhole 1142, to allow ingress of air during drinking (e.g. for smoother liquid flow out the opening). Some embodiments may further include a cover 1145 for the opening 1140, which may be attached to the outer surface of the end plate 1120 of the lid. For example, a sliding cover or cap may be configured, with an open configuration in which it does not span the opening (or the airhole), and a closed configuration in which it covers/closes/seals the opening and/or airhole. The cover 1145 may include an aperture 1146 which is configured to align with the airhole 1142 in open configuration, but to be misaligned from the airhole 1142 in closed configuration. In some embodiments, the cover 1145 may be configured to slide with respect to the end plate 1120 of the lid, for example between open and closed configurations. In some embodiments, the cover 1145 may include a projection 1148 configured as a grip to allow purchase for a user's finger for sliding the cover 1145. In the embodiment shown in FIG. 11, the cover 1145 is configured to completely slide away from (e.g. so as to not cover) the opening 1140 in the end plate 1120. In other embodiments, the cover may include a spout configured to align with the opening 1140 in open configuration and to be out of alignment with the opening 1140 in closed configuration.

Figure 12A:
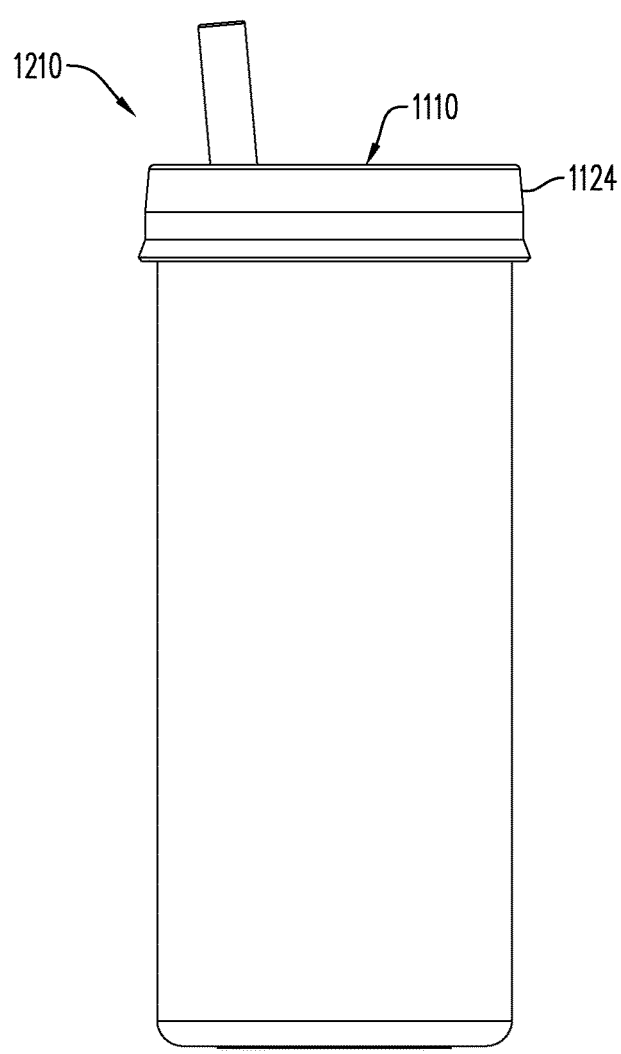
FIG. 12A illustrates a side elevation view of an exemplary lid, similar to that of FIG. 11A, as applied to an exemplary insulated container (e.g. having an exemplary removable insert vessel within a double-walled outer vessel), and in this embodiment (except for the placement of the optional straw), all side views may be identical.
Figure 12B:
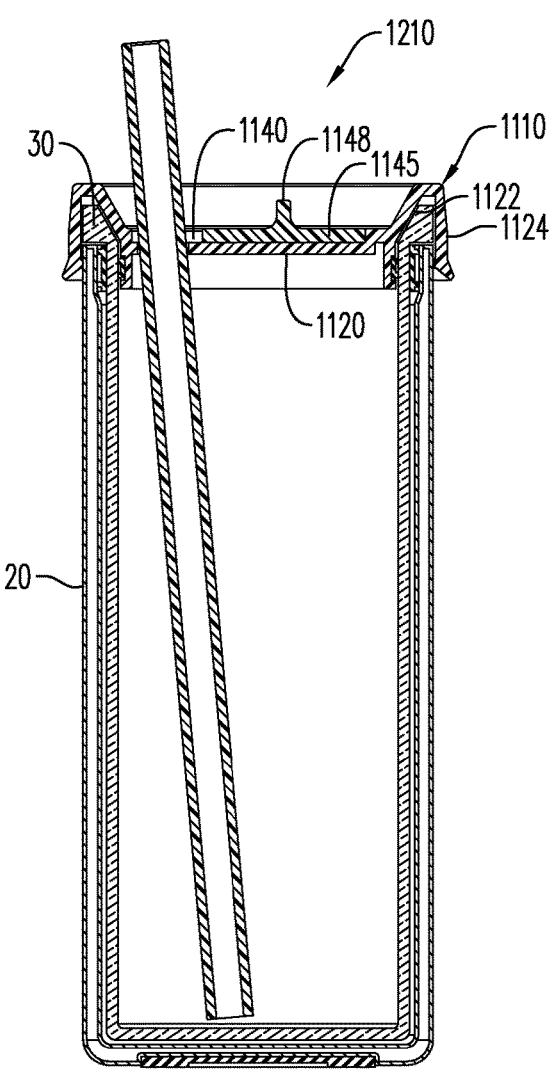
FIG. 12B illustrates a cross-sectional view of the lidded insulated container of FIG. 12A.
Figure 12C:
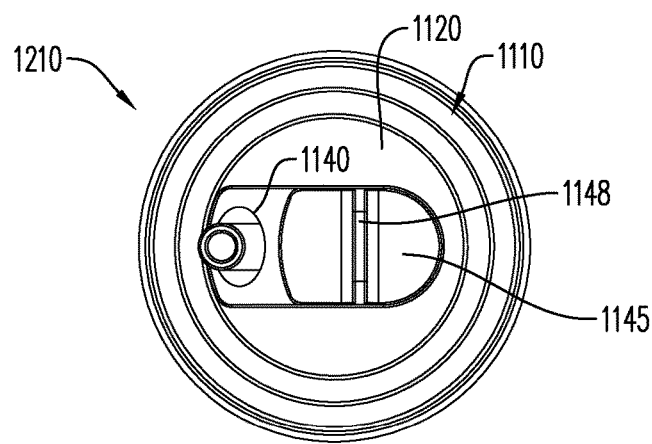
FIG. 12C illustrates a top plan view of the lidded insulated container of FIG. 12A.
Figure 12D:
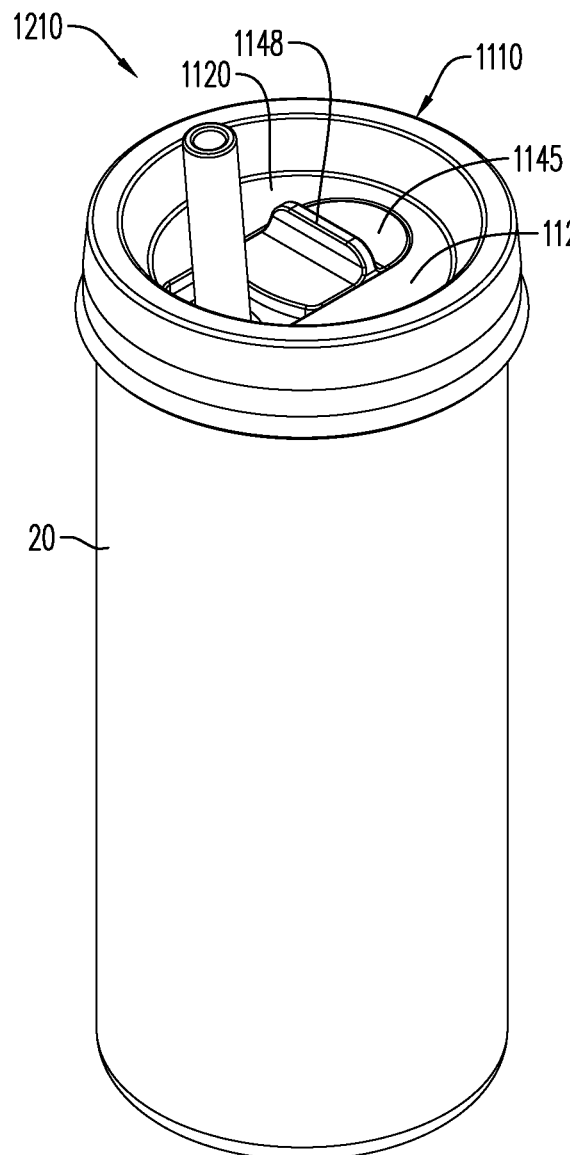
FIG. 12D illustrates a perspective view of the lidded insulated container of FIG. 12A.
Figure 12E:
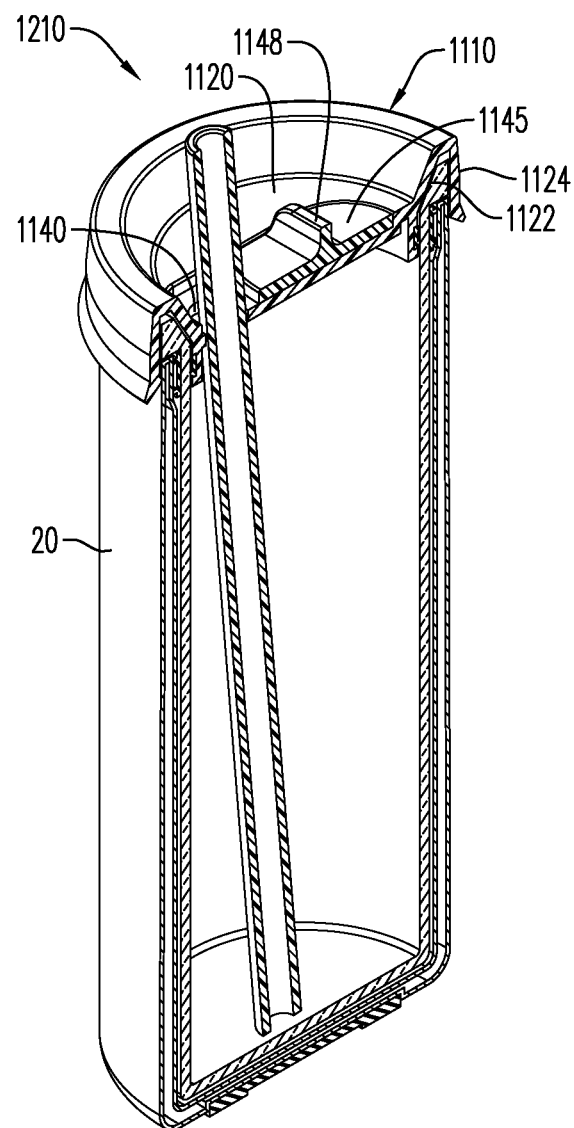
FIG. 12E illustrates a cross-sectional perspective view of the lidded insulated container of FIG. 12A.

FIGS. 12A-12C illustrate an exemplary pool-safe lid 1110 (which may be similar to embodiments described herein) disposed on an insulated container (which may include an outer container 20, which may be a double-walled structure in some embodiments, and an insert vessel/structure 30, which may be disposed within the outer container, all of which may be similar to embodiments described herein). FIG. 12A illustrates a side elevation view of the lid disposed on the insulated container, and FIG. 12C illustrates a top plan view (e.g. showing a top view of the exemplary lid).

FIG. 12B illustrates a cross-section view of the lid disposed on the insulated container. In FIG. 12B, the interaction (e.g. with corresponding/matching/mating shapes) between the lid and the sipping portion can be clearly seen. The straw shown in these figures is optional, and may interact with the lid to pass therethrough. In various embodiments included herein, exemplary pool-safe lids 1110 may be configured for and/or used in conjunction with any of the insulated container embodiments described herein.

The present disclosure, in various embodiments, configurations and aspects, includes components, methods, processes, systems and/or apparatus substantially developed as depicted and described herein, including various embodiments, sub-combinations, and subsets thereof. Those of skill in the art will understand how to make and use the present disclosure after understanding the present disclosure. The present disclosure, in various embodiments, configurations and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

Approximating language, as used herein throughout the specification and claims, may be applied to modify any quantitative representation that could permissibly vary without resulting in a change in the basic function to which it is related. Accordingly, a value modified by a term such as "about" or "approximately" is not to be limited to the precise value specified. Such approximating language may refer to the specific value and/or may include a range of values that may have the same impact or effect as understood by persons of ordinary skill in the art field. For example, approximating language may include a range of +/−10%, +/−5%, or +/−3%. The term "substantially" as used herein is used in the common way understood by persons of skill in the art field with regard to patents, and may in some instances function as approximating language. In some instances, the approximating language may correspond to the precision of an instrument for measuring the value.

In this specification and the claims that follow, reference will be made to a number of terms that have the following meanings. The terms "a" (or "an") and "the" refer to one or more of that entity, thereby including plural referents unless the context clearly dictates otherwise. As such, the terms "a" (or "an"), "one or more" and "at least one" can be used interchangeably herein. Furthermore, references to "one embodiment", "some embodiments", "an embodiment" and the like are not intended to be interpreted as excluding the existence of additional embodiments that also incorporate the recited features. Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Terms such as "first," "second," "upper," "lower" etc. are used to identify one element from another, and unless otherwise specified are not meant to refer to a particular order or number of elements.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

As used in the claims, the word "comprises" and its grammatical variants logically also subtend and include phrases of varying and differing extent such as for example, but not limited thereto, "consisting essentially of" and "consisting of." Where necessary, ranges have been supplied, and those ranges are inclusive of all sub-ranges therebetween. It is to be expected that variations in these ranges will suggest themselves to a practitioner having ordinary skill in the art and, where not already dedicated to the public, the appended claims should cover those variations.

The terms "determine", "calculate" and "compute," and variations thereof, as used herein, are used interchangeably and include any type of methodology, process, mathematical operation or technique.

The foregoing discussion of the present disclosure has been presented for purposes of illustration and description. The foregoing is not intended to limit the present disclosure to the form or forms disclosed herein. In the foregoing Detailed Description for example, various features of the present disclosure are grouped together in one or more embodiments, configurations, or aspects for the purpose of streamlining the disclosure. The features of the embodiments, configurations, or aspects of the present disclosure may be combined in alternate embodiments, configurations, or aspects other than those discussed above. This method of disclosure is not to be interpreted as reflecting an intention that the present disclosure requires more features than are expressly recited in each claim. Rather, as the following claims reflect, the claimed features lie in less than all features of a single foregoing disclosed embodiment, configuration, or aspect. Thus, the following claims are hereby incorporated into this Detailed Description, with each claim standing on its own as a separate embodiment of the present disclosure.

Advances in science and technology may make equivalents and substitutions possible that are not now contemplated by reason of the imprecision of language; these variations should be covered by the appended claims. This written description uses examples to disclose the method, machine and computer-readable medium, including the best mode, and also to enable any person of ordinary skill in the art to practice these, including making and using any devices or systems and performing any incorporated methods. The patentable scope thereof is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A drinking vessel, comprising:
    a glass container configured for receipt within a hollow interior defined by an outer vessel fabricated from metal, the glass container having:
        a body including a closed end and an open end, the body defining a hollow interior extending between the closed end and the open end; and
        a sipping portion extending from the open end and having a shoulder end and a sipping end; and
    a deformable retaining flange configured to removably retain the glass container within the outer vessel, the deformable retaining flange including:
        a deformable main body configured to be positioned about a circumference of an outer surface of the glass container; and
        at least one flexible protrusion extending from the deformable main body and configured to provide for a friction fit and removable retention of the glass container within the outer vessel.

2. The drinking vessel according to claim 1, wherein the at least one flexible protrusion includes multiple segments circumferentially spaced apart from each other.

3. The drinking vessel according to claim 1, wherein the at least one flexible protrusion is a plurality of flexible protrusions.

4. The drinking vessel according to claim 1, wherein the shoulder end of the sipping portion protrudes radially outward from the open end of the body of the glass container.

5. The drinking vessel according to claim 4, wherein the sipping end of the sipping portion protrudes upwardly from the shoulder end of the sipping portion.

6. The drinking vessel according to claim 1, wherein the body of the glass container and the sipping portion of the glass container are monolithically formed with one another.

7. The drinking vessel according to claim 1, wherein the deformable retaining flange is positioned underneath the shoulder end of the sipping portion of the glass container when the glass container is positioned in the outer vessel.

8. A drinking vessel assembly, comprising:
    an outer vessel fabricated from metal, the outer vessel defining a hollow interior;
    a glass container configured for receipt within the hollow interior of the outer vessel; and
    a deformable retaining flange configured to removably retain the glass container within the outer vessel, the deformable retaining flange including:
        a deformable main body configured to be positioned about a circumference of an outer surface of the glass container; and
        at least one flexible protrusion extending from the deformable main body and configured to provide for a friction fit and removable retention of the glass container within the outer vessel.

9. The drinking vessel assembly according to claim 8, wherein the glass container includes:
    a body having a closed end and an open end, the body defining a hollow interior extending between the closed end and the open end; and
    a sipping portion extending from the open end of the body of the glass container and having a shoulder end and a sipping end.

10. The drinking vessel assembly according to claim 9, wherein the shoulder end of the sipping portion protrudes radially outward from the open end of the body of the glass container.

11. The drinking vessel assembly according to claim 10, wherein the sipping end of the sipping portion protrudes upwardly from the shoulder end of the sipping portion.

12. The drinking vessel assembly according to claim 9, wherein the body of the glass container and the sipping portion of the glass container are monolithically formed with one another.

13. The drinking vessel assembly according to claim 9, wherein the deformable retaining flange is positioned underneath the shoulder end of the sipping portion of the glass container when the glass container is positioned in the outer vessel.

14. The drinking vessel assembly according to claim 8, wherein the at least one flexible protrusion includes multiple segments circumferentially spaced apart from each other.

15. The drinking vessel assembly according to claim 8, wherein the at least one flexible protrusion is a plurality of flexible protrusions.

16. The drinking vessel assembly according to claim 8, wherein when the glass container is positioned within the hollow interior of the outer vessel, at least a portion of the deformable retaining flange is compressed between the glass container and an inner surface of the outer vessel.

17. The drinking vessel assembly according to claim 8, wherein the deformable retaining flange is engaged to an inner surface of the outer vessel at a stepped portion of the inner surface of the outer vessel.

18. The drinking vessel assembly according to claim 8, wherein the outer vessel is a double-walled structure.

19. The drinking vessel assembly according to claim 18, wherein an outer surface of the outer vessel includes at least one indentation partially extending from the outer surface of the outer vessel towards an inner surface of the outer vessel.

20. The drinking vessel assembly according to claim 18, wherein an outer diameter of the outer vessel increases from a closed end of the outer vessel to an open end of the outer vessel.

\* \* \* \* \*